United States Patent
Bicerano

(10) Patent No.: US 9,034,799 B2
(45) Date of Patent: *May 19, 2015

(54) THERMOSET NANOCOMPOSITE PARTICLES, PROCESSING FOR THEIR PRODUCTION, AND THEIR USE IN OIL AND NATURAL GAS DRILLING APPLICATIONS

(71) Applicant: Sun Drilling Products Corporation, Belle Chasse, LA (US)

(72) Inventor: Jozef Bicerano, Midland, MI (US)

(73) Assignee: Sun Drilling Products Corporation, Belle Chasse, LA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/495,444

(22) Filed: Sep. 24, 2014

(65) Prior Publication Data
US 2015/0011439 A1    Jan. 8, 2015

Related U.S. Application Data

(60) Continuation of application No. 13/717,636, filed on Dec. 17, 2012, which is a continuation of application No. 13/629,018, filed on Sep. 27, 2012, now Pat. No. 8,466,093, which is a continuation of application No. 13/353,542, filed on Jan. 19, 2012, now Pat. No.

(Continued)

(51) Int. Cl.
| | | |
|---|---|---|
| C09K 8/24 | (2006.01) | |
| B82Y 30/00 | (2011.01) | |
| C04B 16/08 | (2006.01) | |
| C09K 8/035 | (2006.01) | |
| C09K 8/473 | (2006.01) | |
| C09K 8/80 | (2006.01) | |
| E21B 43/267 | (2006.01) | |

(52) U.S. Cl.
CPC ............ *C09K 8/24* (2013.01); *Y10T 428/2998* (2015.01); *Y10T 428/2982* (2015.01); *B82Y 30/00* (2013.01); *C04B 16/082* (2013.01); *C09K 8/035* (2013.01); *C09K 8/473* (2013.01); *C09K 8/80* (2013.01); *C09K 2208/10* (2013.01); *E21B 43/267* (2013.01)

(58) Field of Classification Search
None
See application file for complete search history.

(56) References Cited

U.S. PATENT DOCUMENTS

| 6,451,953 | B1* | 9/2002 | Albright | 526/348 |
| 2002/0055581 | A1* | 5/2002 | Lorah et al. | 524/445 |
| 2005/0272611 | A1* | 12/2005 | Lord et al. | 507/200 |

*Primary Examiner* — Alicia Bland
(74) *Attorney, Agent, or Firm* — Morgan, Lewis & Bockius, LLP

(57) ABSTRACT

Use of two different methods, either each by itself or in combination, to enhance the stiffness, strength, maximum possible use temperature, and environmental resistance of thermoset polymer particles is disclosed. One method is the application of post-polymerization process steps (and especially heat treatment) to advance the curing reaction and to thus obtain a more densely crosslinked polymer network. The other method is the incorporation of nanofillers, resulting in a heterogeneous "nanocomposite" morphology. Nanofiller incorporation and post-polymerization heat treatment can also be combined to obtain the benefits of both methods simultaneously. The present invention relates to the development of thermoset nanocomposite particles. Optional further improvement of the heat resistance and environmental resistance of said particles via post-polymerization heat treatment; processes for the manufacture of said particles; and use of said particles in the construction, drilling, completion and/or fracture stimulation of oil and natural gas wells are described.

4 Claims, 8 Drawing Sheets

Related U.S. Application Data

8,278,373, which is a continuation of application No. 13/340,080, filed on Dec. 29, 2011, now Pat. No. 8,455,403, which is a continuation of application No. 12/980,510, filed on Dec. 29, 2010, now Pat. No. 8,088,718, which is a division of application No. 12/870,076, filed on Aug. 27, 2010, now Pat. No. 7,902,125, which is a division of application No. 11/323,031, filed on Dec. 30, 2005, now Pat. No. 7,803,740.

(60) Provisional application No. 60/640,965, filed on Dec. 30, 2004.

THERMOSET NANOCOMPOSITE PARTICLES, PROCESSING FOR THEIR PRODUCTION, AND THEIR USE IN OIL AND NATURAL GAS DRILLING APPLICATIONS

CROSS-REFERENCE TO RELATED APPLICATIONS

The present application is a continuation of U.S. patent application Ser. No. 13/717,636 , filed 17 Dec. 2012, (now allowed), which is a continuation of U.S. patent application Ser. No. 13/629,018, filed 27 Sep. 2012, (now issued as U.S. Pat. No. 8,466,093), which is a continuation of U.S. patent application Ser. No. 13/353,542, filed 19 Jan. 2012, (now issued as U.S. Pat. No. 8,278,373), which in turn is a continuation of prior U.S. application Ser. No. 13/340,080, filed Dec. 29, 2011, (now issued as U.S. Pat. No. 8,455,403), which in turn is a continuation of prior U.S. application Ser. No. 12/980,510, filed Dec. 29, 2010, (now issued as U.S. Pat. No. 8,088,718), which in turn is a division of prior U.S. application Ser. No. 12/870,076, filed 27 Aug. 2010 (now issued as U.S. Pat No. 7,902,125), which in turn is a divisional of prior U.S. application Ser. No. 11/323,031, filed 30 Dec 2005, (now issued as U.S. Pat. 7,803,740), which in turn claims priority from U.S. Provisional Application Serial No. 60/640,965, filed 30 Dec. 2004, (now expired), all of which are hereby incorporated by reference herein in their entireties.

FIELD OF THE INVENTION

The present invention relates to lightweight thermoset polymer nanocomposite particles, to processes for the manufacture of such particles, and to applications of such particles. The particles of the invention contain one or optionally more than one type of nanofiller that is intimately embedded in the polymer matrix. It is possible to use a wide range of thermoset polymers and nanofillers as the main constituents of the particles of the invention, and to produce said particles by means of a wide range of fabrication techniques. Without reducing the generality of the invention, in its currently preferred embodiments, the thermoset matrix consists of a terpolymer of styrene, ethylinylbenzene and divinylbenzene; particulate carbon black of nanoscale dimensions is used as the nanofiller, suspension polymerization is performed in the presence of the nanofiller, and optionally post-polymerization heat treatment is performed with the particles still in the reactor fluid that remains after the suspension polymerization to further advance the curing of the matrix polymer. When executed in the manner taught by this patent, many properties of both the individual particles and packings of said particles can be improved by the practice of the invention. The particles exhibit enhanced stiffness, strength, heat resistance, and resistance to aggressive environments; as well as the improved retention of high conductivity of liquids and gases through packings of said particles in aggressive environments under high compressive loads at elevated temperatures. The thermoset polymer nanocomposite particles of the invention can be used in many applications. These applications include, but are not limited to, the construction, drilling, completion and/or fracture stimulation of oil and natural gas wells; for example, as a proppant partial monolayer, a proppant pack, an integral component of a gravel pack completion, a ball bearing, a solid lubricant, a drilling mud constituent, and/or a cement additive.

BACKGROUND

The background of the invention can be described most clearly, and hence the invention can be taught most effectively, by subdividing this section in three subsections. The first subsection will provide some general background regarding the role of crosslinked (and especially stiff and strong thermoset) particles in the field of the invention. The second subsection will describe the prior art that has been taught in the patent literature. The third subsection will provide additional relevant background information selected from the vast scientific literature on polymer and composite materials science and chemistry, to further facilitate the teaching of the invention.

A. General Background

Crosslinked polymer (and especially stiff and strong thermoset) particles are used in many applications requiring high stiffness, high mechanical strength, high temperature resistance, and/or high resistance to aggressive environments. Crosslinked polymer particles can be prepared by reacting monomers or oligomers possessing three or more reactive chemical functionalities, as well as by reacting mixtures of monomers and/or oligomers at least one ingredient of which possesses three or more reactive chemical functionalities.

The intrinsic advantages of crosslinked polymer particles over polymer particles lacking a network consisting of covalent chemical bonds in such applications become especially obvious if an acceptable level of performance must be maintained for a prolonged period (such as many years, or in some applications even several decades) under the combined effects of mechanical deformation, heat, and/or severe environmental insults. For example, many high-performance thermoplastic polymers, which have excellent mechanical properties and which are hence used successfully under a variety of conditions, are unsuitable for applications where they must maintain their good mechanical properties for many years in the presence of heat and/or chemicals, because they consist of assemblies of individual polymer chains. Over time, the deformation of such assemblies of individual polymer chains at an elevated temperature can cause unacceptable amounts of creep, and furthermore solvents and/or aggressive chemicals present in the environment can gradually diffuse into them and degrade their performance severely (and in some cases even dissolve them). By contrast, the presence of a well-formed continuous network of covalent bonds restrains the molecules, thus helping retain an acceptable level of performance under severe use conditions over a much longer time period.

Oil and natural gas well construction activities, including drilling, completion and stimulation applications (such as proppants, gravel pack components, ball bearings, solid lubricants, drilling mud constituents, and/or cement additives), require the use of particulate materials, in most instances preferably of as nearly spherical a shape as possible. These (preferably substantially spherical) particles must generally be made from materials that have excellent mechanical properties. The mechanical properties of greatest interest in most such applications are stiffness (resistance to deformation) and strength under compressive loads, combined with sufficient "toughness" to avoid the brittle fracture of the particles into small pieces commonly known as "fines". In addition, the particles must have excellent heat resistance in order to be able to withstand the combination of high compressive load and high temperature that normally becomes increasingly more severe as one drills deeper. In other words, particles that are intended for use deeper in a well must be able to withstand not only the higher overburden load resulting from the greater depth, but also the higher temperature that accompanies that higher overburden load as a result of the nature of geothermal gradients. Finally, these materials must be able to withstand the effects of the severe environmental insults (resulting from the presence of a variety of hydrocarbon and possibly solvent molecules as well as water, at simultaneously elevated temperatures and compressive loads) that the particles will encounter deep in an oil or natural gas well. The need for relatively lightweight high performance materials for use in these particulate components in applications related to the construction, drilling, completion and/or fracture stimulation of oil and natural gas wells thus becomes obvious. Consequently, while such uses constitute only a small fraction of the applications of stiff and strong materials, they provide fertile territory for the development of new or improved materials and manufacturing processes for the fabrication of such materials.

We will focus much of the remaining discussion of the background of the invention on the use of particulate materials as proppants. One key measure of end use performance of proppants is the retention of high conductivity of liquids and gases through packings of the particles in aggressive environments under high compressive loads at elevated temperatures.

The use of stiff and strong solid proppants has a long history in the oil and natural gas industry. Throughout most of this history, particles made from polymeric materials (including crosslinked polymers) have been considered to be unsuitable for use by themselves as proppants. The reason for this prejudice is the perception that polymers are too deformable, as well as lacking in the ability to withstand the combination of elevated compressive loads, temperatures and aggressive environments that are commonly encountered in oil and natural gas wells. Consequently, work on proppant material development has focused mainly on sands, on ceramics, and on sands and ceramics coated by crosslinked polymers to improve some aspects of their performance. This situation has prevailed despite the fact that most polymers have densities that are much closer to that of water so that in particulate form they can be transported much more readily into a fracture by low-density fracturing or carrier fluids such as unviscosified water.

Nonetheless, the obvious practical advantages [see a review by Edgeman (2004)] of developing the ability to use lightweight particles that possess almost neutral buoyancy relative to water have stimulated a considerable amount of work over the years. However, as will be seen from the review of the prior art provided below, progress in this field of invention has been very slow as a result of the many technical challenges that exist to the successful development of cost-effective lightweight particles that possess sufficient stiffness, strength and heat resistance.

B. Prior Art

The prior art can be described most clearly, and hence the invention can be placed in the proper context most effectively, by subdividing this section into four subsections. The first subsection will describe prior art related to the development of "as-polymerized" thermoset polymer particles. The second subsection will describe prior art related to the development of thermoset polymer particles that are subjected to post-polymerization heat treatment. The third subsection will describe prior art related to the development of thermoset polymer composite particles where the particles are reinforced by conventional fillers. The fourth subsection will describe prior art related to the development of ceramic nanocomposite particles where a ceramic matrix is reinforced by nanofillers.

1. "As-Polymerized" Thermoset Polymer Particles

As discussed above, particles made from polymeric materials have historically been considered to be unsuitable for use by themselves as proppants. Consequently, their past uses in proppant materials have focused mainly on their placement as coatings on sands and ceramics, in order to improve some aspects of the performance of the sand and ceramic proppants.

Significant progress was made in the use of crosslinked polymeric particles themselves as constituents of proppant formulations in prior art taught by Rickards, et al. (U.S. Pat. No. 6,059,034; U.S. Pat. No. 6,330,916). However, these inventors still did not consider or describe the polymeric particles as proppants. Their invention only related to the use of the polymer particles in blends with particles of more conventional proppants such as sands or ceramics. They taught that the sand or ceramic particles are the proppant particles, and that the "deformable particulate material" consisting of polymer particles mainly serves to improve the fracture conductivity, reduce the generation of fines and/or reduce proppant flowback relative to the unblended sand or ceramic proppants. Thus while their invention differs significantly from the prior art in the sense that the polymer is used in particulate form rather than being used as a coating, it shares with the prior art the limitation that the polymer still serves merely as a modifier improving the performance of a sand or ceramic proppant rather than being considered for use as a proppant in its own right.

Bienvenu (U.S. Pat. No. 5,531,274) disclosed progress towards the development of lightweight proppants consisting of high-strength crosslinked polymeric particles for use in hydraulic fracturing applications. However, embodiments of this prior art, based on the use of styrene-divinylbenzene (S-DVB) copolymer beads manufactured by using conventional fabrication technology and purchased from a commercial supplier, failed to provide an acceptable balance of performance and price. They cost far more than the test standard (Jordan sand) while being outperformed by Jordan sand in terms of the liquid conductivity and liquid permeability characteristics of their packings measured according to the industry-standard API RP 61 testing procedure. [This procedure is described by the American Petroleum Institute in its publication titled "Recommended Practices for Evaluating Short Term Proppant Pack Conductivity" (first edition, Oct. 1, 1989).] The need to use a very large amount of an expensive crosslinker (50 to 80% by weight of DVB) in order to obtain reasonable performance (not too inferior to that of Jordan Sand) was a key factor in the higher cost that accompanied the lower performance.

The most advanced prior art in stiff and strong crosslinked polymer particle technologies for use in applications in oil and natural gas drilling was developed by Albright (U.S. Pat. No. 6,248,838) who taught the concept of a "rigid chain entanglement crosslinked polymer". In summary, the reactive formulation and the processing conditions were modified to achieve "rapid rate polymerization". While not improving the extent of covalent crosslinking relative to conventional isothermal polymerization, rapid rate polymerization results in the "trapping" of an unusually large number of physical entanglements in the polymer. These additional entanglements can result in a major improvement of many properties. For example, the liquid conductivities of packings of S-DVB copolymer beads with $w_{DVB}=0.2$ synthesized via rapid rate polymerization are comparable to those that were found by Bienvenu (U.S. Pat. No. 5,531,274) for packings of conventionally produced S-DVB beads at the much higher DVB level of $w_{DVB}=0.5$. Albright (U.S. Pat. No. 6,248,838) thus provided the key technical breakthrough that enabled the development of the first generation of crosslinked polymer beads possessing sufficiently attractive combinations of performance and price characteristics to result in their commercial use in their own right as solid polymeric proppants.

2. Heat-Treated Thermoset Polymer Particles

There is no prior art that relates to the development of heat-treated thermoset polymer particles for use in oil and natural gas well construction applications. One needs to look into another field of technology to find prior art of some relevance. Nishimori, et. al. (JP1992-22230) focused on the development of particles for use in liquid crystal display panels. They taught the use of post-polymerization heat treatment to increase the compressive elastic modulus of S-DVB particles at room temperature. They only claimed compositions polymerized from reactive monomer mixtures containing 20% or more by weight of DVB or other crosslinkable monomer(s) prior to the heat treatment. They stated explicitly that improvements obtained with lower weight fractions of the crosslinkable monomer(s) were insufficient and that hence such compositions were excluded from the scope of their patent.

3. Thermoset Polymer Composite Particles

This subsection will be easier to understand if it is further subdivided into two subsections. As was discussed above, the prior art on the use of polymers as components of proppant particles has focused mainly on the development of thermoset polymer coatings for rigid inorganic materials such as sand or ceramic particles. These types of heterogeneous (composite) particles will be discussed in the first subsection. Composite particles where the thermoset polymer plays a role that goes beyond that of a coating will be discussed in the second subsection.

a. Thermoset Polymers as Coatings

The prior art discussed in this subsection is mainly of interest for historical reasons, as examples of the evolution of the use of thermoset polymers as components in composite proppant particles.

Underdown, et al. (U.S. Pat. No. 4,443,347) and of Glaze, et al. (U.S. Pat. No. 4,664,819) taught the coating of particles such as silica sand or glass beads with a thermoset polymer (such as a phenol-formaldehyde resin) that is cured fully (in their terminology, "pre-cured") prior to the injection of a proppant charge consisting of such particles into a well.

An interesting alternative coating technology was taught by Graham, et al. (U.S. Pat. No. 4,585,064) who developed resin-coated particles comprising a particulate substrate, a substantially cured inner resin coating, and a heat-curable outer resin coating. According to their teaching, the outer resin coating should cure, and should thus enable the particles to form a coherent mass possessing the desired level of liquid conductivity, under the temperatures and compressive loads found in subterranean formations. However, it is not difficult to anticipate the many technical difficulties that can arise in attempting to reduce such an approach reliably and consistently to practice.

b. Thermoset Polymers as Matrix Phase Containing Dispersed Finely Divided Filler Material McDaniel, et al. (U.S. Pat. No. 6,632,527) describes composite particles made of a binder and filler; for use in subterranean formations (for example, as proppants and as gravel pack components), in water filtration, and in artificial turf for sports fields. The filler consists of finely divided mineral particles that can be of any available composition. Fibers are also used in some embodiments as optional fillers. The sizes of the filler particles are required to fall within the range of 0.5 microns to 60 microns. The proportion of filler in the composite particle is very large (60% to 90% by volume). The binder formulation is required to include at least one member of the group consisting of inorganic binder, epoxy resin, novolac resin, resole resin, polyurethane resin, alkaline phenolic resole curable with ester, melamine resin, urea-aldehyde resin, urea-phenol-aldehyde resin, furans, synthetic rubber, and/or polyester resin. The final thermoset polymer composite particles of the required size and shape are obtained by a succession of process steps such as the mixing of a binder stream with a filler particle stream, agglomerative granulation, and the curing of granulated material streams.

4. Ceramic Nanocomposite Particles

Nguyen, et al. (U.S. 20050016726) taught the development of ceramic nanocomposite particles comprising a base material (present at roughly 50% to 90% by weight) and at least one nanoparticle material (present at roughly 0.1% to 30% by weight). Optionally, a polymeric binder, an organosilane coupling agent, and/or hollow microspheres, can also be included. The base material comprises clay, bauxite, alumina, silica, or mixtures thereof. It is stated that a suitable method for forming the composite particulates from the dry ingredients is to sinter by heating at a temperature of between roughly 1000° C. and 2000° C., which is a ceramic fabrication process. Given the types of formulation ingredients used as base materials by Nguyen, et al. (U.S. 20050016726), and furthermore the fact that even if they were to incorporate a polymeric binder in an embodiment of their invention said polymeric binder would not retain its normal chemical composition and polymer chain structure when a particulate is sintered by heating it at a temperature of between 1000° C. and about 2000° C., their composite particulates consist of the nanofiller(s) dispersed in a ceramic matrix.

C. Scientific Literature

The development of thermoset polymer nanocomposites requires the consideration of a vast and multidisciplinary range of polymer and composite materials science and chemistry challenges. It is essential to convey these challenges in the context of the fundamental scientific literature.

Bicerano (2002) provides a broad overview of polymer and composite materials science that can be used as a general reference for most aspects of the following discussion. Many additional references will also be provided below, to other publications which treat specific issues in greater detail than what could be accommodated in Bicerano (2002).

1. Selected Fundamental Aspects of the Curing of Crosslinked Polymers

It is essential, first, to review some fundamental aspects of the curing of crosslinked polymers, which are applicable to such polymers regardless of their form (particulate, coating, or bulk).

The properties of crosslinked polymers prepared by standard manufacturing processes are often limited by the fact that such processes typically result in incomplete curing. For example, in an isothermal polymerization process, as the glass transition temperature ($T_g$) of the growing polymer network increases, it may reach the polymerization temperature while the reaction is still in progress. If this happens, then the molecular motions slow down significantly so that further curing also slows down significantly. Incomplete curing yields a polymer network that is less densely crosslinked than the theoretical limit expected from the functionalities and relative amounts of the starting reactants. For example, a mixture of monomers might contain 80% DVB by weight as a crosslinker but the final extent of crosslinking that is attained may not be much greater than what was attained with a much smaller percentage of DVB. This situation results in lower stiffness, lower strength, lower heat resistance, and lower environmental resistance than the thermoset is capable of manifesting when it is fully cured and thus maximally crosslinked.

When the results of the first scan and the second scan of S-DVB beads containing various weight fractions of DVB ($w_{DVB}$), obtained by Differential Scanning calorimetry (DSC), as reported by Bicerano, et al. (1996) (see FIG. 1) are compared, it becomes clear that the low performance and high cost of the "as purchased" S-DVB beads utilized by Bienvenu (U.S. Pat. No. 5,531,274) are related to incomplete curing. This incomplete curing results in the ineffective utilization of DVB as a crosslinker and thus in the incomplete development of the crosslinked network. In summary, Bicerano, et al. (1996), showed that the $T_g$ of typical "as-polymerized" S-DVB copolymers, as measured by the first DSC scan, increased only slowly with increasing $w_{DVB}$, and furthermore that the rate of further increase of $T_g$ slowed down drastically for $w_{DVB}>0.08$. By contrast, in the second DSC scan (performed on S-DVB specimens whose curing had been driven much closer to completion as a result of the temperature ramp that had been applied during the first scan), $T_g$ grew much more rapidly with $w_{DVB}$ over the entire range of up to $w_{DVB}=0.2458$ that was studied. The more extensively cured samples resulting from the thermal history imposed by the first DSC scan can, thus, be considered to provide much closer approximations to the ideal theoretical limit of a "fully cured" polymer network.

2. Effects of Heat Treatment on Key Properties of Thermoset Polymers a. Maximum Possible Use Temperature As was illustrated by Bicerano, et al. (1996) for S-DVB copolymers with $w_{DVB}$ of up to 0.2458, enhancing the state of cure of a thermoset polymer network can increase $T_g$ very significantly relative to the $T_g$ of the "as-polymerized" material. In practice, the heat distortion temperature (HDT) is used most often as a practical indicator of the softening temperature of a polymer under load. As was shown by Takemori (1979), a systematic understanding of the HDT is possible through its direct correlation with the temperature dependences of the tensile (or equivalently, compressive) and shear elastic moduli. For amorphous polymers, the precipitous decrease of these elastic moduli as $T_g$ is approached from below renders the HDT well-defined, reproducible, and predictable. HDT is thus closely related to (and usually slightly lower than) $T_g$ for amorphous polymers, so that it can be increased significantly by increasing $T_g$ significantly.

The HDT decreases gradually with increasing magnitude of the load used in its measurement. For example, for general-purpose polystyrene (which has $T_g=100°$ C.), HDT=95° C. under a load of 0.46 MPa and HDT=85° C. under a load of 1.82 MPa are typical values. However, the compressive loads deep in an oil well or natural gas well are normally far higher than the standard loads (0.46 MPa and 1.82 MPa) used in measuring the HDT. Consequently, amorphous thermoset polymer particles can be expected to begin to deform significantly at a lower temperature than the HDT of the polymer measured under the standard high load of 1.82 MPa. This deformation will cause a decrease in the conductivities of liquids and gases through the propped fracture, and hence in the loss of effectiveness as a proppant, at a somewhat lower temperature than the HDT value of the polymer measured under the standard load of 1.82 MPa.

b. Mechanical Properties

As was discussed earlier, Nishimori, et. al. (JP1992-22230) used heat treatment to increase the compressive elastic modulus of their S-DVB particles (intended for use in liquid crystal display panels) significantly at room temperature (and hence far below $T_g$). Deformability under a compressive load is inversely proportional to the compressive elastic modulus. It is, therefore, important to consider whether one may also anticipate major benefits from heat treatment in terms of the reduction of the deformability of thermoset polymer particles intended for oil and natural gas drilling applications, when these particles are used in subterranean environments where the temperature is far below the $T_g$ of the particles. As explained below, the enhancement of curing via post-polymerization heat treatment is generally expected to have a smaller effect on the compressive elastic modulus (and hence on the proppant performance) of thermoset polymer particles when used in oil and natural gas drilling applications at temperatures far below their $T_g$.

Nishimori, et. al. (JP1992-22230) used very large amounts of DVB ($w_{DVB}>>0.2$). By contrast, much smaller amounts of DVB ($w_{DVB}\leq0.2$) must be used for economic reasons in the "lower value" oil and natural gas drilling applications. The elastic moduli of a polymer at temperatures far below $T_g$ are determined primarily by deformations that are of a rather local nature and hence on a short length scale. Some enhancement of the crosslink density via further curing (when the network junctions created by the crosslinks are far away from each other to begin with) will hence not normally have nearly as large an effect on the elastic moduli as when the network junctions are very close to each other to begin with and then are brought even closer by the enhancement of curing via heat treatment. Consequently, while the compressive elastic modulus can be expected to increase significantly upon heat treatment when $w_{DVB}$ is very large, any such effect will normally be less pronounced at low values of $w_{DVB}$. In summary, it can thus generally be expected that the enhancement of the compressive elastic modulus at temperatures far below $T_g$ will probably be small for the types of formulations that are most likely to be used in the synthesis of thermoset polymer particles for oil and natural gas drilling applications.

3. Effects of Nanoparticle Incorporation on Key Properties of Thermoset Polymers a. Maximum Possible Use Temperature As was pointed out by Takemori (1979), the addition of rigid fillers has a negligible effect on the HDT of amorphous polymers. However, nanocomposite materials and technologies had not yet been developed in 1979. It is, hence, important to consider, based on the data that have been gathered and the insights that have been obtained more recently, whether nanofillers may be expected to behave in a qualitatively different manner because of their geometric characteristics.

A review article by Aharoni (1998) considered this question and showed that three criteria must be considered. Here are the most relevant excerpts from his article: "When a combination of the following three conditions is fulfilled, then the glass transition temperature . . . may be increased relative to that of the same polymer in the absence of these three conditions . . . . First, very large surface area of a rigid heterogeneous material in close contact with the amorphous phase of the polymer. Such large surface areas may be obtained by having a rigid additive material extremely finely ground, preferably to nanometer length scale. Second, strong attractive interactions should exist between the heterogeneous surfaces and the polymer. In the absence of strong attractive interactions with the heterogeneous rigid surfaces, the chain segments in the boundary layer are capable of relaxing to a state approximating the bulk polymer and the $T_g$ will be identical or very slightly higher than that of the pure bulk polymer. Third, measure of motional cooperation must exist between interchain and intrachain fragments. Unlike the effects of high modulus heterogeneous additives on the averaged modulus of the system in which they are present, the elevation of $T_g$ of the polymer matrix was repeatedly shown to require not only that the polymer itself will be a high molecular weight substance, but that the additive will be finely comminuted to generate very large polymer-heterophase interfacial surface area, and, especially important, that strong attractive interactions will exist between the polymer and the foreign additive. These interactions are generally of an ionic, hydrogen bonding, or dipolar nature and, as a rule, require that the foreign additive will have surface energy higher than or at least equal to, but never lower than, that of the amorphous polymer in which it is being incorporated."

Almost by definition, Aharoni's first condition will be satisfied for any nanofiller that has been dispersed well in the polymer matrix. Furthermore, since a thermoset polymer contains a covalently bonded three-dimensional network structure, his third condition will also be satisfied if any thermoset polymer is used as the matrix material. However, in most systems, there will not be strong attractive interactions "generally of an ionic, hydrogen bonding, or dipolar nature" between the polymer and the nanofiller, so that the second criterion will not be satisfied. It can, therefore, be concluded that, for most combinations of polymer and nanofiller, $T_g$ will not increase significantly upon incorporation of the nanofiller so that the maximum possible use temperature will not increase significantly either. There will, however, be exceptions to this general rule. Combinations of polymer and nanofiller that manifest strong attractive interactions can be found, and for such combinations both $T_g$ and the maximum possible use temperature can increase significantly upon nanofiller incorporation.

b. Mechanical Properties

It is well-established that the incorporation of rigid fillers into a polymer matrix can produce a composite material which has significantly greater stiffness (elastic modulus) and strength (stress required to induce failure) than the base polymer. It is also well-established that rigid nanofillers can generally stiffen and strengthen a polymer matrix more effectively than conventional rigid fillers of similar composition since their geometries allow them to span (or "percolate through") a polymer specimen at much lower volume fractions than conventional fillers. This particular advantage of nanofillers over conventional fillers is well-established and a major driving force for the vast research and development effort worldwide to develop new nanocomposite products.

FIG. 2 provides an idealized schematic illustration of the effectiveness of nanofillers in terms of their ability to "percolate through" a polymer specimen even when they are present at a low volume fraction. It is important to emphasize that FIG. 2 is of a completely generic nature. It is presented merely to facilitate the understanding of nanofiller percolation, without implying that it provides an accurate depiction of the expected behavior of any particular nanofiller in any particular polymer matrix. In practice, the techniques of electron microscopy are generally used to observe the morphologies of actual embodiments of the nanocomposite concept. Specific examples of the ability of nanofillers such as carbon black and fumed silica to "percolate" at extremely low volume fractions when dispersed in polymers are provided by Zhang, et al (2001). The vast literature and trends on the dependences of percolation thresholds and packing fractions on particle shape, aggregation, and other factors, are reviewed by Bicerano, et al. (1999).

As has also been studied extensively [for example, see Okamoto, et al. (1999)] but is less widely recognized by workers in the field, the incorporation of rigid fillers of appropriate types and dimensions in the right amount (often just a very small volume fraction) can toughen a polymer in addition to stiffening it and strengthening it. "Toughening" implies a reduction in the tendency to undergo brittle fracture. If and when it is realized for proppant particles, it is an important additional benefit since it reduces the risk of the generation of "fines" during use.

4. Technical Challenges to Nanoparticle Incorporation in Thermoset Polymers

It is important to also review the many serious technical challenges that exist to the successful incorporation of nanoparticles in thermoset polymers. Appreciation of these obstacles can help workers in the field of the invention gain a better understanding of the invention. There are three major types of potential obstacles. In general, each potential obstacle will tend to become more serious with increasing nanofiller volume fraction, so that it is usually easier to incorporate a small volume fraction of a nanofiller into a polymer than it is to incorporate a larger volume fraction. This subsection is subdivided further into the following three subsections where each type of major potential obstacle will be discussed in turn.

a. Difficulty of Dispersing Nanofiller

The most common difficulty that is encountered in preparing polymer nanocomposites involves the need to disperse the nanofiller. The specific details of the source and severity of the difficulty, and of the methods that may help overcome the difficulty, differ between types of nanofillers, polymers, and fabrication processes (for example, the "in situ" synthesis of the polymer in an aqueous or organic medium containing the nanofiller, versus the addition of the nanofiller into a molten polymer). However, some important common aspects can be identified.

Most importantly, nanofiller particles of the same kind often have strong attractive interactions with each other. As a result, they tend to "clump together"; for example, preferably into agglomerates (if the nanofiller is particulate), bundles (if the nanofiller is fibrous), or stacks (if the nanofiller is discoidal). In most systems, their attractive interactions with each other are stronger than their interactions with the molecules constituting the dispersing medium, so that their dispersion is thermodynamically disfavored and hence extremely difficult.

Even in systems where the dispersion of the nanofillers is thermodynamically favored, it is often still very difficult to achieve because of the large kinetic barriers (activation energies) that must be surmounted. Consequently, nanofillers are very rarely easy to disperse in a polymer.

b. High Dispersion Viscosity

Another difficulty with the fabrication of nanocomposites is the fact that, once the nanofiller is dispersed in the appropriate medium (for example, an aqueous or organic medium containing the nanofiller for the "in situ" synthesis of the polymer, or a molten polymer into which nanofiller is added), the viscosity of the resulting dispersion may (and often does) become very high. When this happens, it can impede the successful execution of the fabrication process steps that must follow the dispersion of the nanofiller to complete the preparation of the nanocomposite.

Dispersion rheology is a vast area of both fundamental and applied research. It dates back to the 19$^{th}$ century, so that there is a vast collection of data and a good fundamental understanding of the factors controlling the viscosities of dispersions. Nonetheless, it is still at the frontiers of materials science, so that major new experimental and theoretical progress is continuing to be made. In fact, the advent of nanotechnology, and the frequent emergence of high dispersion viscosity as an obstacle to the fabrication of polymer nanocomposites, have been instrumental in advancing the state of the art in this field. Bicerano, et al. (1999) have provided a comprehensive overview which can serve as a resource for workers interested in learning more about this topic.

c. Interference with Polymerization and Network Formation

An additional potential difficulty may be encountered in systems where chemical reactions are taking place in a medium containing a nanofiller. This is the possibility that the nanofiller may have an adverse effect on the chemical reactions. As can reasonably be expected, any such adverse effects can be far more severe in systems where polymerization and network formation take place simultaneously in the presence of a nanofiller than they can in systems where preformed polymer chains are crosslinked in the presence of a nanofiller. The preparation of an S-DVB nanocomposite via suspension polymerization in a medium containing a nanofiller is an example of a process where polymerization and network formation both take place in the presence of a nanofiller. On the other hand, the vulcanization of a nanofilled rubber is a process where preformed polymer chains are crosslinked in the presence of a nanofiller.

The combined consideration of the work of Lipatov, et al. (1966, 1968), Popov, et al. (1982), and Bryk, et al. (1985, 1986, 1988) helps in providing a broad perspective into the nature of the difficulties that may arise. To summarize, the presence of a filler with a high specific surface area can disrupt both polymerization and network formation in a process such as the suspension polymerization of an S-DVB copolymer nanocomposite. These outcomes can arise from the combined effects of the adsorption of initiators on the surfaces of the nanofiller particles and the interactions of the growing polymer chains with the nanofiller surfaces. Adsorption on the nanofiller surface can affect the rate of thermal decomposition of the initiator. Interactions of the growing polymer chains with the nanofiller surfaces can result both in the reduction of the mobility of growing polymer chains and in their breakage. Very strong attractions between the initiator and the nanofiller surfaces (for example, the grafting of the initiators on the nanofiller surfaces) can potentially augment all of these detrimental effects.

Taguchi, et al. (1999) provided a fascinating example of how drastically the formulation can affect the particle morphology. They described the results obtained by adding hydrophilic fine powders [nickel (Ni) of mean particle size 0.3 microns, indium oxide ($In_2O_3$) of mean particle size 0.03 microns, and magnetite ($Fe_3O_4$) of mean particle size 0.1, 0.3 or 0.9 microns] to the aqueous phase during the suspension polymerization of S-DVB. These particles had such a strong affinity to the aqueous phase that they did not even go inside the S-DVB beads. Instead, they remained entirely outside the beads. Consequently, the composite particles consisted of S-DVB beads whose surfaces were uniformly covered by a coating of inorganic powder. Furthermore, these S-DVB beads rapidly became smaller with increasing amount of powder at a fixed powder particle diameter, as well as with decreasing powder particle diameter (and hence increasing number concentration of powder particles) at a given powder weight fraction.

SUMMARY OF THE INVENTION

The present invention involves a novel approach towards the practical development of stiff, strong, tough, heat resistant, and environmentally resistant ultralightweight particles, for use in the construction, drilling, completion and/or fracture stimulation of oil and natural gas wells.

The disclosure is summarized below in three key aspects: (A) Compositions of Matter (thermoset nanocomposite particles that exhibit improved properties compared with prior art), (B) Processes (methods for manufacture of said compositions of matter), and (C) Applications (utilization of said compositions of matter in the construction, drilling, completion and/or fracture stimulation of oil and natural gas wells).

The disclosure describes lightweight thermoset nanocomposite particles whose properties are improved relative to prior art. The particles targeted for development include, but are not limited to, terpolymers of styrene, ethylinylbenzene and divinylbenzene; reinforced by particulate carbon black of nanoscale dimensions. The particles exhibit any one or any combination of the following properties: enhanced stiffness, strength, heat resistance, and/or resistance to aggressive environments; and/or improved retention of high conductivity of liquids and/or gases through packings of said particles when said packings are placed in potentially aggressive environments under high compressive loads at elevated temperatures.

The disclosure also describes processes that can be used to manufacture said particles. The fabrication processes targeted for development include, but are not limited to, suspension polymerization in the presence of nanofiller, and optionally post-polymerization heat treatment with said particles still in the reactor fluid that remains after the suspension polymerization to further advance the curing of the matrix polymer.

The disclosure finally describes the use of said particles in practical applications. The targeted applications include, but are not limited to, the construction, drilling, completion and/or fracture stimulation of oil and natural gas wells; for example, as a proppant partial monolayer, a proppant pack, an integral component of a gravel pack completion, a ball bearing, a solid lubricant, a drilling mud constituent, and/or a cement additive.

A. Compositions of Matter

The compositions of matter of the present invention are thermoset polymer nanocomposite particles where one or optionally more than one type of nanofiller is intimately embedded in a polymer matrix. Any additional formulation component(s) familiar to those skilled in the art can also be used during the preparation of said particles; such as initiators, catalysts, inhibitors, dispersants, stabilizers, rheology modifiers, buffers, antioxidants, defoamers, impact modifiers, plasticizers, pigments, flame retardants, smoke retardants, or mixtures thereof. Some of the said additional component(s) may also become either partially or completely incorporated into said particles in some embodiments of the invention. However, the two required major components of said particles are a thermoset polymer matrix and at least one nanofiller. Hence this subsection will be further subdivided into three subsections. Its first subsection will teach the volume fraction of nanofiller(s) that may be used in the particles of the invention. Its second subsection will teach the types of thermoset polymers that may be used as matrix materials. Its third subsection will teach the types of nanofillers that may be incorporated.

1. Nanofiller Volume Fraction

By definition, a nanofiller possesses at least one principal axis dimension whose length is less than 0.5 microns (500 nanometers). This geometric attribute is what differentiates a nanofiller from a finely divided conventional filler, such as the fillers taught by McDaniel, et al. (U.S. Pat. No. 6,632,527) whose characteristic lengths ranged from 0.5 microns to 60 microns.

The dispersion of a nanofiller in a polymer is generally more difficult than the dispersion of a conventional filler of similar chemical composition in the same polymer. However, if dispersed properly during composite particle fabrication, nanofillers can reinforce the matrix polymer far more efficiently than conventional fillers. Consequently, while 60% to 90% by volume of filler is claimed by McDaniel, et al. (U.S. Pat. No. 6,632,527), only 0.001% to 60% by volume of nanofiller is claimed in the present invention.

Without reducing the generality of the present invention, a nanofiller volume fraction of 0.1% to 15% is used in its currently preferred embodiments.

2. Matrix Polymers

Any rigid thermoset polymer may be used as the matrix polymer of the present invention. Rigid thermoset polymers are, in general, amorphous polymers where covalent crosslinks provide a three-dimensional network. However, unlike thermoset elastomers (often referred to as "rubbers") which also possess a three-dimensional network of covalent crosslinks, the rigid thermosets are, by definition, "stiff". In other words, they have high elastic moduli at "room temperature" (25° C.), and often up to much higher temperatures, because their combinations of chain segment stiffness and crosslink density result in a high glass transition temperature.

Some examples of rigid thermoset polymers that can be used as matrix materials of the invention will be provided below. It is to be understood that these examples are being provided without reducing the generality of the invention, merely to facilitate the teaching of the invention.

Rigid thermoset polymers that are often used as matrix (often referred to as "binder") materials in composites include, but are not limited to, crosslinked epoxies, epoxy vinyl esters, polyesters, phenolics, polyurethanes, and polyureas. Rigid thermoset polymers that are used less often because of their high cost despite their exceptional performance include, but are not limited to, crosslinked polyimides. These various types of polymers can, in different embodiments of the invention, be prepared by starting either from their monomers, or from oligomers that are often referred to as "prepolymers", or from suitable mixtures of monomers and oligomers.

Many additional types of rigid thermoset polymers can also be used as matrix materials in composites, and are all within the scope of the invention. Such polymers include, but are not limited to, various families of crosslinked copolymers prepared most often by the polymerization of vinylic monomers, of vinylidene monomers, or of mixtures thereof.

The "vinyl fragment" is commonly defined as the $CH_2=CH-$ fragment. So a "vinylic monomer" is a monomer of the general structure $CH_2=CHR$ where R can be any one of a vast variety of molecular fragments or atoms (other than hydrogen). When a vinylic monomer $CH_2=CHR$ reacts, it is incorporated into the polymer as the $-CH_2-CHR-$ repeat unit. Among rigid thermosets built from vinylic monomers, the crosslinked styrenics and crosslinked acrylics are especially familiar to workers in the field. Some other familiar types of vinylic monomers (among others) include the olefins, vinyl alcohols, vinyl esters, and vinyl halides.

The "vinylidene fragment" is commonly defined as the $CH_2=CR''-$ fragment. So a "vinylidene monomer" is a monomer of the general structure $CH_2=CR'R''$ where R' and R'' can each be any one of a vast variety of molecular fragments or atoms (other than hydrogen). When a vinylidene monomer $CH_2=CR'R''$ reacts, it is incorporated into a polymer as the $-CH_2-CR'R''-$ repeat unit. Among rigid thermosets built from vinylidene polymers, the crosslinked alkyl acrylics [such as crosslinked poly(methyl methacrylate)] are especially familiar to workers in the field. However, vinylidene monomers similar to each type of vinyl monomer (such as the styrenics, acrylates, olefins, vinyl alcohols, vinyl esters and vinyl halides, among others) can be prepared. One example of particular interest in the context of styrenic monomers is a-methyl styrene, a vinylidene-type monomer that differs from styrene (a vinyl-type monomer) by having a methyl ($-CH_3$) group serving as the R'' fragment replacing the hydrogen atom attached to the α-carbon.

Thermosets based on vinylic monomers, on vinylidene monomers, or on mixtures thereof, are typically prepared by the reaction of a mixture containing one or more non-crosslinking (difunctional) monomer and one or more crosslinking (three or higher functional) monomers. All variations in the choices of the non-crosslinking monomer(s), the crosslinking monomers(s), and their relative amounts [subject solely to the limitation that the quantity of the crosslinking monomer(s) must not be less than 1% by weight], are within the scope of the invention.

Without reducing the generality of the invention, in its currently preferred embodiments, the thermoset matrix consists of a terpolymer of styrene (non-crosslinking), ethylinylbenzene (also non-crosslinking), and divinylbenzene (crosslinking), with the weight fraction of divinylbenzene ranging from 3% to 35% by weight of the starting monomer mixture.

3. Nanofillers

By definition, a nanofiller possesses at least one principal axis dimension whose length is less than 0.5 microns (500 nanometers). Some nanofillers possess only one principal axis dimension whose length is less than 0.5 microns. Other nanofillers possess two principal axis dimensions whose lengths are less than 0.5 microns. Yet other nanofillers possess all three principal axis dimensions whose lengths are less than 0.5 microns. Any reinforcing material possessing one nanoscale dimension, two nanoscale dimensions, or three nanoscale dimensions, can be used as the nanofiller in embodiments of the invention. Any mixture of two or more different types of such reinforcing materials can also be used as the nanofiller in embodiments of the invention.

Some examples of nanofillers that can be incorporated into the nanocomposites of the invention will be provided below. It is to be understood that these examples are being provided without reducing the generality of the invention, merely to facilitate the teaching of the invention.

Nanoscale carbon black, fumed silica and fumed alumina, such as products of these types that are currently being manufactured by the Cabot Corporation, consist of aggregates of small primary particles. See FIG. 3 for a schematic illustration of such an aggregate, and of a larger agglomerate. The aggregates may contain many very small primary particles, often arranged in a "fractal" pattern, resulting in aggregate principal axis dimensions that are also shorter than 0.5 microns. These aggregates (and not the individual primary particles that constitute them) are, in general, the smallest units of these nanofillers that are dispersed in a polymer matrix under normal fabrication conditions. The available grades of such nanofillers include variations in specific surface area, extent of branching (structure) in the aggregates, and chemical modifications intended to facilitate dispersion in different types of media (such as aqueous or organic mixtures). Some product types of such nanofillers are also provided in "fluffy" grades of lower bulk density that are easier to disperse than the base grade but less convenient to transport and store since the same weight of material occupies more volume when it is in its fluffy form. Some products grades of such nanofillers are also provided pre-dispersed in an aqueous medium.

Carbon nanotubes, carbon nanofibers, and cellulosic nanofibers constitute three other classes of nanofillers. When separated from each other by breaking up the bundles in which they are often found and then dispersed well in a polymer, they serve as fibrous reinforcing agents. In different products grades, they may have two principal axis dimensions in the nanoscale range (below 500 nanometers), or they may have all three principal axis dimensions in the nanoscale range (if they have been prepared by a process that leads to the formation of shorter nanotubes or nanofibers). Currently, carbon nanotubes constitute the most expensive nanofillers of fibrous shape. Carbon nanotubes are available in single-wall and multi-wall versions. The single-wall versions offer the highest performance, but currently do so at a much higher cost than the multi-wall versions. Nanotubes prepared from inorganic materials (such as boron nitride) are also available.

Natural and synthetic nanoclays constitute another major class of nanofiller. Nanocor and Southern Clay Products are the two leading suppliers of nanoclays at this time. When "exfoliated" (separated from each other by breaking up the stacks in which they are normally found) and dispersed well in a polymer, the nanoclays serve as discoidal (platelet-shaped) reinforcing agents. The thickness of an individual platelet is around one nanometer (0.001 microns). The lengths in the other two principal axis dimensions are much larger. They range between 100 and 500 nanometers in many product grades, thus resulting in a platelet-shaped nanofiller that has three nanoscale dimensions. They exceed 500 nanometers, and thus result in a nanofiller that has only one nanoscale dimension, in some other grades.

Many additional types of nanofillers are also available; including, but not limited to, very finely divided grades of fly ash, the polyhedral oligomeric silsesquioxanes, and clusters of different types of metals, metal alloys, and metal oxides. Since the development of nanofillers is an area that is at the frontiers of materials research and development, the future emergence of yet additional types of nanofillers that are not currently known may also be readily anticipated.

Without reducing the generality of the invention, in its currently preferred embodiments, nanoscale carbon black grades supplied by Cabot Corporation are being used as the nanofiller.

B. Processes

In most cases, the incorporation of a nanofiller into the thermoset polymer matrix will increase the compressive elastic modulus uniformly throughout the entire use temperature range (albeit usually not by exactly the same factor at each temperature), while not increasing $T_g$ significantly. The resulting nanocomposite particles will then perform better as proppants over their entire use temperature range, but without an increase in the maximum possible use temperature itself. On the other hand, if a suitable post-polymerization process step is applied to the nanocomposite particles, in many cases the curing reaction will be driven further towards completion so that $T_g$ (and hence also the maximum possible use temperature) will increase along with the increase induced by the nanofiller in the compressive elastic modulus.

Processes that may be used to enhance the degree of curing of a thermoset polymer include, but are not limited to, heat treatment (which may be combined with stirring and/or sonication to enhance its effectiveness), electron beam irradiation, and ultraviolet irradiation. We focused mainly on the use of heat treatment in order to increase the $T_g$ of the thermoset matrix polymer, to make it possible to use nanofiller incorporation and post-polymerization heat treatment as complementary methods, to improve the performance characteristics of the particles even further by combining the anticipated main benefits of each method. FIG. 4 provides an idealized schematic illustration of the benefits of implementing these methods and concepts.

The processes that may be used for the fabrication of the thermoset nanocomposite particles of the invention have at least one, and optionally two, major step(s). The required step is the formation of said particles by means of a process that allows the intimate embedment of the nanofiller in the polymer matrix. The optional step is the use of an appropriate postcuring method to advance the curing reaction of the thermoset matrix and to thus obtain a polymer network that approaches the "fully cured" limit. Consequently, this subsection will be further subdivided into two subsections, dealing with polymerization and with postcure respectively.

1. Polymerization and Network Formation in Presence of Nanofiller

Any method for the fabrication of thermoset composite particles known to those skilled in the art may be used to prepare embodiments of the thermoset nanocomposite particles of the invention. Without reducing the generality of the invention, some such methods will be discussed below to facilitate the teaching of the invention.

The most practical methods for the formation of composites containing rigid thermoset matrix polymers involve the dispersion of the filler in a liquid (aqueous or organic) medium followed by the "in situ" formation of the crosslinked polymer network around the filler. This is in contrast with the formation of thermoplastic composites where melt blending can instead also be used to mix a filler with a fully formed molten polymer. It is also in contrast with the vulcanization of a filled rubber, where preformed polymer chains are crosslinked in the presence of a filler.

The implementation of such methods in the preparation of thermoset nanocomposite particles is usually more difficult to accomplish in practice than their implementation in the preparation of composite particles containing conventional fillers. As discussed earlier, common challenges involve difficulties in dispersing the nanofiller, high nanofiller dispersion viscosity, and possible interferences of the nanofiller with polymerization and network formation. Nonetheless, these challenges can all be surmounted by making judicious choices of the formulation ingredients and their proportions, and then also determining and using the optimum processing conditions.

McDaniel, et al. (U.S. Pat. No. 6,632,527) prepared polymer composite particles with thermoset matrix formulations. Their formulations were based on at least one member of the group consisting of inorganic binder, epoxy resin, novolac resin, resole resin, polyurethane resin, alkaline phenolic resole curable with ester, melamine resin, urea-aldehyde resin, urea-phenol-aldehyde resin, furans, synthetic rubber, and/or polyester resin. They taught the incorporation of conventional filler particles, whose sizes ranged from 0.5 microns to 60 microns, at 60% to 90% by volume. Their fabrication processes differed in details depending on the specific formulation, but in general included steps involving the mixing of a binder stream with a filler particle stream, agglomerative granulation, and the curing of a granulated material stream to obtain thermoset composite particles of the required size and shape. These processes can also be used to prepare the thermoset nanocomposite particles of the present invention, where nanofillers possessing at least one principal axis dimension shorter than 0.5 microns are used at a volume fraction that does not exceed 60% and that is far smaller than 60% in the currently preferred embodiments. The processes of McDaniel, et al. (U.S. Pat. No. 6,632,527) are, hence, incorporated herein by reference.

As was discussed earlier, many additional types of thermoset polymers can also be used as the matrix materials in composites. Examples include crosslinked polymers prepared from various styrenic, acrylic or olefinic monomers (or mixtures thereof). It is more convenient to prepare particles of such thermoset polymers (as well as of their composites and nanocomposites) by using methods that can produce said particles directly in the desired (usually substantially spherical) shape during polymerization from the starting monomers. (While it is a goal of this invention to create spherical particles, it is understood that it is exceedingly difficult as well as unnecessary to obtain perfectly spherical particles. Therefore, particles with minor deviations from a perfectly spherical shape are considered perfectly spherical for the purposes of this disclosure.) Suspension (droplet) polymerization is the most powerful method available for accomplishing this objective. Two main approaches exist to suspension polymerization. The first approach is isothermal polymerization which is the conventional approach that has been practiced for many decades. The second approach is "rapid rate polymerization" as taught by Albright (U.S. Pat. No. 6,248,838) which is incorporated herein by reference. Without reducing the generality of the invention, suspension polymerization as performed via the rapid rate polymerization approach taught by Albright (U.S. Pat. No. 6,248,838) is used in the current preferred embodiments of the invention.

2. Optional Post-Polymerization Advancement of Curing and Network Formation

As was discussed earlier and illustrated in FIG. 1 with the data of Bicerano, et al. (1996), typical processes for the synthesis of thermoset polymers may result in the formation of incompletely cured networks, and may hence produce thermosets with lower glass transition temperatures and lower maximum use temperatures than is achievable with the chosen formulation of reactants. Furthermore, difficulties related to incomplete cure may sometimes be exacerbated in thermoset nanocomposites because of the possibility of interference by the nanofiller in polymerization and network formation. Consequently, the use of an optional post-polymerization process step (or a sequence of such process steps) to advance the curing of the thermoset matrix of a particle of the invention is an aspect of the invention. Suitable methods include, but are not limited to, heat treatment (also known as "annealing"), electron beam irradiation, and ultraviolet irradiation.

Post-polymerization heat treatment is a very powerful method for improving the properties and performance of S-DVB copolymers (as well as of many other types of thermoset polymers) by helping the polymer network approach its "full cure" limit. It is, in fact, the most easily implementable method for advancing the state of cure of S-DVB copolymer particles. However, it is important to recognize that another post-polymerization method (such as electron beam irradiation or ultraviolet irradiation) may be the most readily implementable one for advancing the state of cure of some other type of thermoset polymer. The use of any suitable method for advancing the curing of the thermoset polymer that is being used as the matrix of a nanocomposite of the present invention after polymerization is within the scope of the invention.

Without reducing the generality of the invention, among the suitable methods, heat treatment is used as the optional post-polymerization method to enhance the curing of the thermoset polymer matrix in the preferred embodiments of the invention. Any desired thermal history can be optionally imposed; such as, but not limited to, isothermal annealing at a fixed temperature; nonisothermal heat exposure with either a continuous or a step function temperature ramp; or any combination of continuous temperature ramps, step function temperature ramps, and/or periods of isothermal annealing at fixed temperatures. In practice, while there is great flexibility in the choice of a thermal history, it must be selected carefully to drive the curing reaction to the maximum final extent possible without inducing unacceptable levels of thermal degradation.

Any significant increase in $T_g$ by means of improved curing will translate directly into an increase of comparable magnitude in the practical softening temperature of the polymer particles under the compressive load imposed by the subterranean environment. Consequently, a significant increase of the maximum possible use temperature of the thermoset polymer particles is the most common benefit of advancing the extent of curing by heat treatment.

A practical concern during the imposition of optional heat treatment is related to the amount of material that is being subjected to heat treatment simultaneously. For example, very small amounts of material can be heat treated uniformly and effectively in vacuum; or in any inert (non-oxidizing) gaseous medium, such as, but not limited to, a helium or nitrogen "blanket". However, heat transfer in a gaseous medium is not nearly as effective as heat transfer in an appropriately selected liquid medium. Consequently, during the optional heat treatment of large quantities of the particles of the invention (such as, but not limited to, the output of a run of a commercial-scale batch production reactor), it is usually necessary to use a liquid medium, and furthermore also to stir the particles vigorously to ensure that the heat treatment is applied as uniformly as possible. Serious quality problems may arise if heat treatment is not applied uniformly; for example, as a result of the particles that were initially near the heat source being overexposed to heat and thus damaged, while the particles that were initially far away from the heat source are not exposed to sufficient heat and are thus not sufficiently postcured.

If a gaseous or a liquid heat treatment medium is used, said medium may contain, without limitation, one or a mixture of any number of types of constituents of different molecular structure. However, in practice, said medium must be selected carefully to ensure that its molecules will not react with the crosslinked polymer particles to a sufficient extent to cause significant oxidative and/or other types of chemical degradation. In this context, it must also be kept in mind that many types of molecules which do not react with a polymer at ambient temperature may react strongly with said polymer at elevated temperatures. The most relevant example in the present context is that oxygen itself does not react with S-DVB copolymers at room temperature, while it causes severe oxidative degradation of S-DVB copolymers at elevated temperatures where there would not be much thermal degradation in its absence.

Furthermore, in considering the choice of medium for heat treatment, it is also important to keep in mind that organic molecules can swell organic polymers, potentially causing "plasticization" and thus resulting in undesirable reductions of $T_g$ and of the maximum possible use temperature. The magnitude of any such detrimental effect increases with increasing similarity between the chemical structures of the molecules in the heat treatment medium and of the polymer chains. For example, a heat transfer fluid consisting of aromatic molecules will tend to swell a styrene-divinylbenzene copolymer particle, as well as tending to swell a nanocomposite particle containing such a copolymer as its matrix. The magnitude of this detrimental effect will increase with decreasing relative amount of the crosslinking monomer (divinylbenzene) used in the formulation. For example, a styrene-divinylbenzene copolymer prepared from a formulation containing only 3% by weight of divinylbenzene will be far more susceptible to swelling in an aromatic liquid than a copolymer prepared from a formulation containing 35% divinylbenzene.

Various means known to those skilled in the art, including but not limited to the stirring and/or the sonication of an assembly of particles being subjected to heat treatment, may also be optionally used to enhance further the effectiveness of the optional heat treatment. The rate of thermal equilibration under a given thermal gradient, possibly combined with the application of any such additional means, depends on many factors. These factors include, but are not limited to, the amount of polymer particles being heat treated simultaneously, the shapes and certain key physical and transport properties of these particles, the shape of the vessel being used for heat treatment, the medium being used for heat treatment, whether external disturbances (such as stirring and/or sonication) are being used to accelerate equilibration, and the details of the heat exposure schedule. Simulations based on the solution of the heat transfer equations may hence be used optionally to optimize the heat treatment equipment and/or the heat exposure schedule.

Without reducing the generality of the invention, in its currently preferred embodiments, the thermoset nanocomposite particles are left in the reactor fluid that remains after suspension polymerization if optional heat treatment is to be used. Said reactor fluid thus serves as the heat treatment medium; and simulations based on the solution of the heat transfer equations are used to optimize the heat exposure schedule. This embodiment of the optional heat treatment works especially well (without adverse effects such as degradation and/or swelling) in enhancing the curing of the thermoset matrix polymer in the currently preferred compositions of matter of the invention. Said preferred compositions of matter consist of terpolymers of styrene, ethylvinylbenzene and divinylbenzene. Since the reactor fluid that remains after the completion of suspension polymerization is aqueous while these terpolymers are very hydrophobic, the reactor fluid serves as an excellent heat transfer medium which does not swell the particles. The use of the reactor fluid as the medium for the optional heat treatment also has the advantage of simplicity since the particles would have needed to be removed from the reactor fluid and placed in another fluid as an extra step before heat treatment if an alternative fluid had been required.

It is, however, important to reemphasize the much broader scope of the invention and the fact that the particular currently preferred embodiments summarized above constitute just a few among the vast variety of possible qualitatively different classes of embodiments. For example, if a hydrophilic thermoset polymer particle were to be developed as an alternative preferred embodiment of the invention in future work, it would obviously not be possible to subject such an embodiment to heat treatment in an aqueous slurry, and a hydrophobic heat transfer fluid would work better for its optional heat treatment.

C. Applications

The obvious practical advantages [see a review by Edgeman (2004)] of developing the ability to use lightweight particles that possess almost neutral buoyancy relative to water have stimulated a considerable amount of work over the years. However, progress in this field of invention has been very slow as a result of the many technical challenges that exist to the successful development of cost-effective lightweight particles that possess sufficient stiffness, strength and heat resistance. The present invention has resulted in the development of such stiff, strong, tough, heat resistant, and environmentally resistant ultralightweight particles; and also of cost-effective processes for the fabrication of said particles. As a result, a broad range of potential applications can be envisioned and are being pursued for the use of the thermoset polymer nanocomposite particles of the invention in the construction, drilling, completion and/or fracture stimulation of oil and natural gas wells. Without reducing the generality of the invention, in its currently preferred embodiments, the specific applications that are already being evaluated are as a proppant partial monolayer, a proppant pack, an integral component of a gravel pack completion, a ball bearing, a solid lubricant, a drilling mud constituent, and/or a cement additive.

It is also important to note that the current selection of preferred embodiments of the invention has resulted from our focus on application opportunities in the construction, drilling, completion and/or fracture stimulation of oil and natural gas wells. Many other applications can also be envisioned for the compositions of matter that fall within the scope of thermoset nanocomposite particles of the invention. For example, one such application is described by Nishimori, et. al. (JP1992-22230), who developed heat-treated S-DVB copolymer (but not composite) particles prepared from formulations containing very high DVB weight fractions for use in liquid crystal display panels. Alternative embodiments of the thermoset copolymer nanocomposite particles of the present invention, tailored towards the performance needs of that application and benefiting from its less restrictive cost limitations, could potentially also be used in liquid crystal display panels. Considered from this perspective, it can be seen readily that the potential applications of the particles of the invention extend far beyond their uses by the oil and natural gas industry.

BRIEF DESCRIPTION OF THE DRAWINGS

The accompanying drawings, which are included to provide further understanding of the invention and are incorporated in and constitute a part of this specification, illustrate embodiments of the invention and, together with the description, serve to explain the principles of the invention.

DESCRIPTION OF THE PREFERRED EMBODIMENTS

Figure 1:
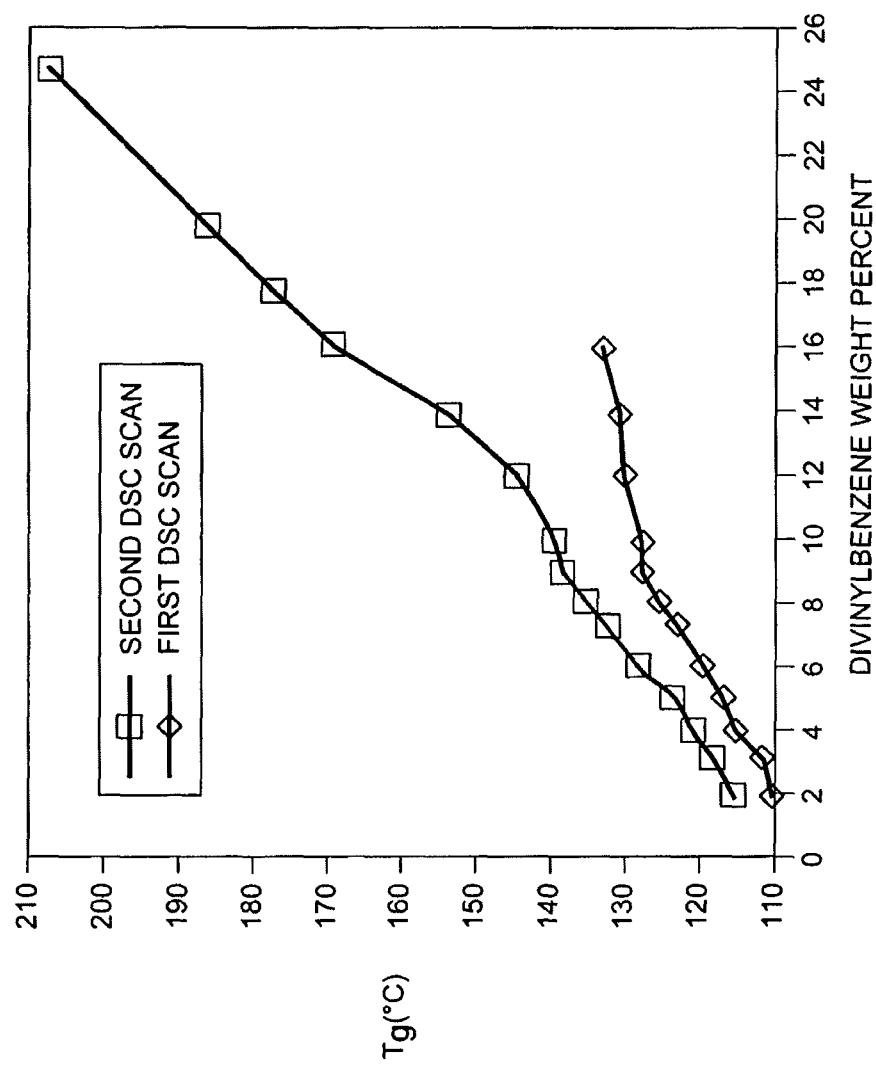
FIG. 1 shows the effects of advancing the curing reaction in a series of isothermally polymerized styrene-divinylbenzene (S-DVB) copolymers containing different DVB weight fractions via heat treatment. The results of scans of S-DVB beads containing various weight fractions of DVB ($w_{DVB}$), obtained by Differential Scanning calorimetry (DSC), and reported by Bicerano, et al. (1996), are compared. It is seen that the $T_g$ of typical "as-polymerized" S-DVB copolymers, as measured by the first DSC scan, increased only slowly with increasing $w_{DVB}$, and furthermore that the rate of further increase of $T_g$ slowed down drastically for $w_{DVB}$>0.08. By contrast, in the second DSC scan (performed on S-DVB specimens whose curing had been driven much closer to completion as a result of the temperature ramp that had been applied during the first scan), $T_g$ grew much more rapidly with $w_{DVB}$ over the entire range of up to $w_{DVB}$=0.2458 that was studied.
Figure 2:
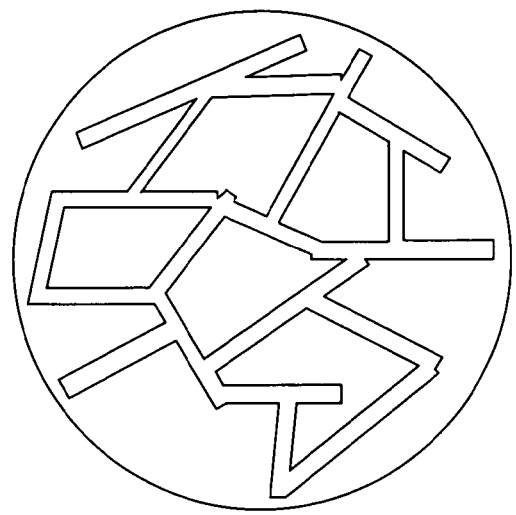
FIG. 2 provides an idealized, generic and schematic two-dimensional illustration of how a very small volume fraction of a nanofiller may be able to "span" and thus "bridge through" a vast amount of space, thus potentially enhancing the load bearing ability of the matrix polymer significantly at much smaller volume fractions than possible with conventional fillers.
Figure 3:
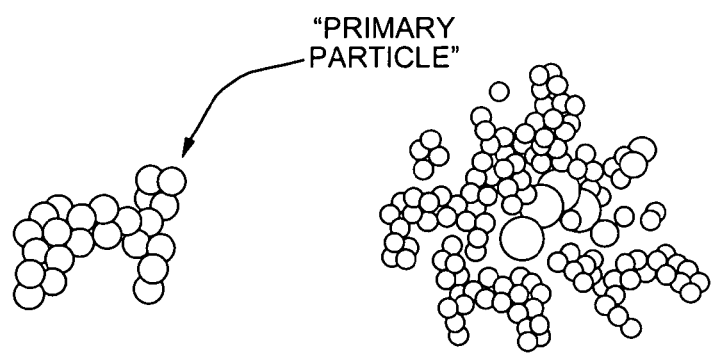
FIG. 3 illustrates the "aggregates" in which the "primary particles" of nanofillers such as nanoscale carbon black, fumed silica and fumed alumina commonly occur. Such aggregates may contain many very small primary particles, often arranged in a "fractal" pattern, resulting in aggregate principal axis dimensions that are also shorter than 0.5 microns. These aggregates (and not the individual primary particles that constitute them) are, usually, the smallest units of such nanofillers that are dispersed in a polymer matrix under normal fabrication conditions, when the forces holding the aggregates together in the much larger "agglomerates" are overcome successfully. This illustration was reproduced from the product literature of Cabot Corporation.
Figure 4:
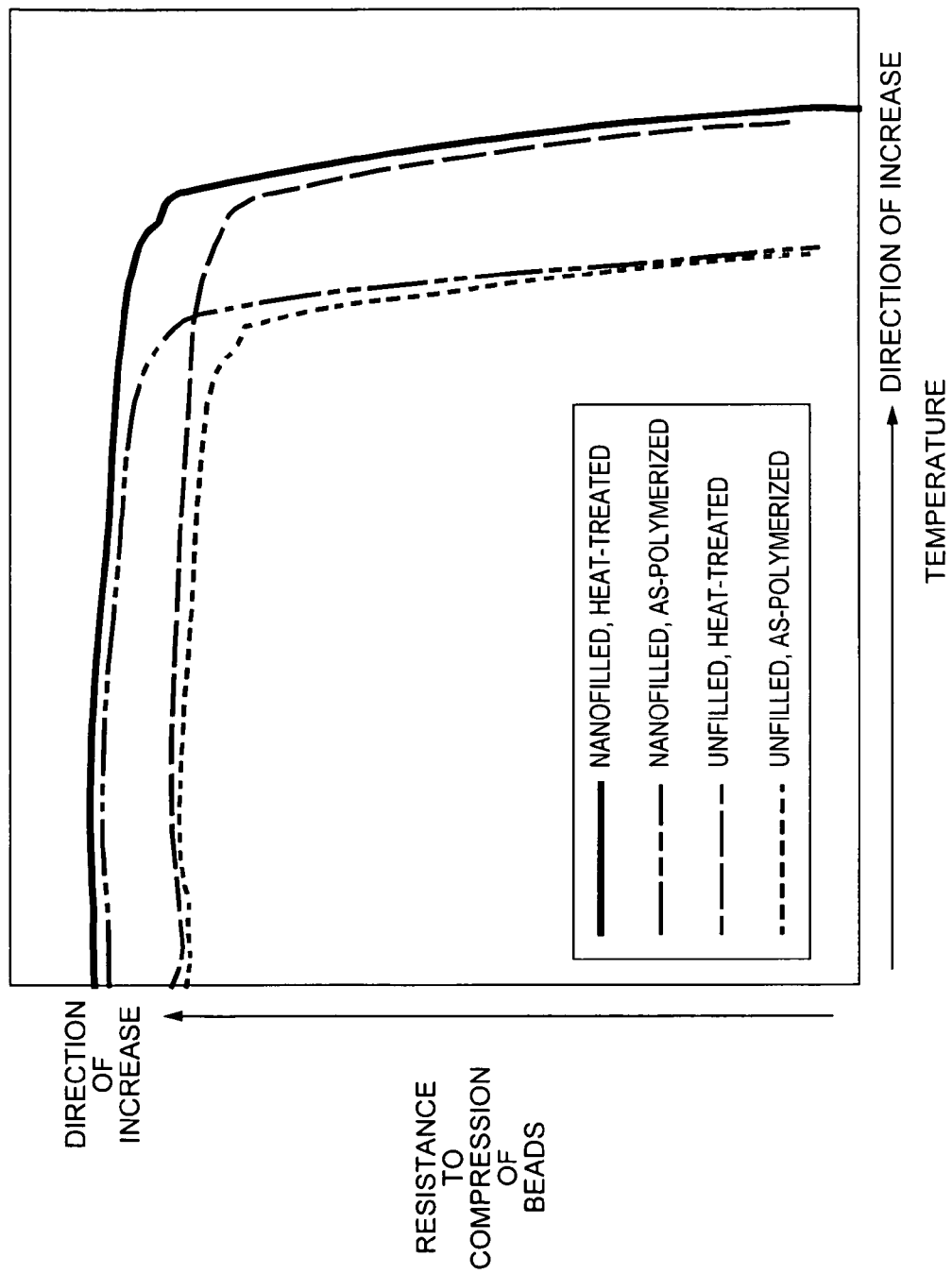
FIG. 4 provides an idealized schematic illustration, in the context of the resistance of thermoset polymer particles to compression as a function of the temperature, of the most common benefits of using the methods of the present invention. In most cases, the densification of the crosslinked polymer network via post-polymerization heat treatment will have the main benefit of increasing the softening (and hence also the maximum possible use) temperature, along with improving the environmental resistance. On the other hand, in most cases, nanofiller incorporation will have the main benefits of increasing the stiffness and strength. The use of nanofiller incorporation and post-polymerization heat treatment together, as complementary methods, will thus often be able to provide all (or at least most) of these benefits simultaneously.

Because the invention will be understood better after further discussion of its currently preferred embodiments, further discussion of said embodiments will now be provided. It is understood that said discussion is being provided without reducing the generality of the invention, since persons skilled in the art can readily imagine many additional embodiments that fall within the full scope of the invention as taught in the SUMMARY OF THE INVENTION section.

A. Nature, Attributes and Applications of Currently Preferred Embodiments

The currently preferred embodiments of the invention are lightweight thermoset nanocomposite particles possessing high stiffness, strength, temperature resistance, and resistance to aggressive environments. These attributes, occurring in combination, make said particles especially suitable for use in many challenging applications in the construction, drilling, completion and/or fracture stimulation of oil and natural gas wells. Said applications include the use of said particles as a proppant partial monolayer, a proppant pack, an integral component of a gravel pack completion, a ball bearing, a solid lubricant, a drilling mud constituent, and/or a cement additive.

B. Thermoset Polymer Matrix

1. Constituents

The thermoset matrix in said particles consists of a terpolymer of styrene (S, non-crosslinking), ethylinylbenzene (EVB, also non-crosslinking), and divinylbenzene (DVB, crosslinking). The preference for such a terpolymer instead of a copolymer of S and DVB is a result of economic considerations. To summarize, DVB comes mixed with EVB in the standard product grades of DVB, and the cost of DVB increases rapidly with increasing purity in special grades of DVB. EVB is a non-crosslinking (difunctional) styrenic monomer. Its incorporation into the thermoset matrix does not result in any significant changes in the properties of the thermoset matrix or of nanocomposites containing said matrix, compared with the use of S as the sole non-crosslinking monomer. Consequently, it is far more cost-effective to use a standard (rather than purified) grade of DVB, thus resulting in a terpolymer where some of the repeat units originate from EVB.

2. Proportions

The amount of DVB in said terpolymer ranges from 3% to 35% by weight of the starting mixture of the three reactive monomers (S, EVB and DVB) because different applications require different maximum possible use temperatures. Even when purchased in standard product grades where it is mixed with a large weight fraction of EVB, DVB is more expensive than S. It is, hence, useful to develop different product grades where the maximum possible use temperature increases with increasing weight fraction of DVB. Customers can then purchase the grades of said particles that meet their specific application needs as cost-effectively as possible.

C. Nanofiller

1. Constituents

The Monarch™ 280 product grade of nanoscale carbon black supplied by Cabot Corporation is being used as the nanofiller in said particles. The reason is that it has a relatively low specific surface area, high structure, and a "fluffy" product form; rendering it especially easy to disperse.

2. Proportions

The use of too low a volume fraction of carbon black results in ineffective reinforcement. The use of too high a volume fraction of carbon black may result in difficulties in dispersing the nanofiller, dispersion viscosities that are too high to allow further processing with available equipment, and detrimental interference in polymerization and network formation. The amount of carbon black ranges from 0.1% to 15% by volume of said particles because different applications require different levels of reinforcement. Carbon black is more expensive than the monomers (S, EVB and DVB) currently being used in the synthesis of the thermoset matrix. It is, therefore, useful to develop different product grades where the extent of reinforcement increases with increasing volume fraction of carbon black. Customers can then purchase the grades of said particles that meet their specific application needs as cost-effectively as possible.

D. Polymerization

Suspension polymerization is performed via rapid rate polymerization, as taught by Albright (U.S. Pat. No. 6,248, 838) which is incorporated herein by reference, for the fabrication of said particles. Rapid rate polymerization has the advantage, relative to conventional isothermal polymerization, of producing more physical entanglements in thermoset polymers (in addition to the covalent crosslinks). Suspension polymerization involves the preparation of an the aqueous phase and an organic phase prior to the commencement of the polymerization process. The Monarch™ 280 carbon black particles are dispersed in the organic phase prior to polymerization. The most important additional formulation component (besides the reactive monomers and the nanofiller particles) that is used during polymerization is the initiator. The initiator may consist of one type molecule or a mixture of two or more types of molecules that have the ability to function as initiators. Additional formulation components, such as catalysts, inhibitors, dispersants, stabilizers, rheology modifiers, buffers, antioxidants, defoamers, impact modifiers, plasticizers, pigments, flame retardants, smoke retardants, or mixtures thereof, may also be used when needed. Some of the additional formulation component(s) may become either partially or completely incorporated into the particles in some embodiments of the invention.

E. Attainable Particle Sizes

Suspension polymerization produces substantially spherical polymer particles. (While it is a goal of this invention to create spherical particles, it is understood that it is exceedingly difficult as well as unnecessary to obtain perfectly spherical particles. Therefore, particles with minor deviations from a perfectly spherical shape are considered perfectly spherical for the purposes of this disclosure.) Said particles can be varied in size by means of a number of mechanical and/or chemical methods that are well-known and well-practiced in the art of suspension polymerization. Particle diameters attainable by such means range from submicron values up to several millimeters. Hence said particles may be selectively manufactured over the entire range of sizes that are of present interest and/or that may be of future interest for applications in the oil and natural gas industry.

F. Optional Further Selection of Particles by Size

Optionally, after the completion of suspension polymerization, said particles can be separated into fractions having narrower diameter ranges by means of methods (such as, but not limited to, sieving techniques) that are well-known and well-practiced in the art of particle separations. Said narrower diameter ranges include, but are not limited to, nearly monodisperse distributions. Optionally, assemblies of particles possessing bimodal or other types of special distributions, as well as assemblies of particles whose diameter distributions follow statistical distributions such as gaussian or log-normal, can also be prepared.

The optional preparation of assemblies of particles having diameter distributions of interest from any given "as polymerized" assembly of particles can be performed before or after any optional heat treatment of said particles. Without reducing the generality of the invention, in the currently most preferred embodiments of the invention, any optional preparation of assemblies of particles having diameter distributions of interest from the product of a run of the pilot plant or production plant reactor is performed after the completion of any optional heat treatment of said particles.

The particle diameters of current practical interest for various uses in the construction, drilling, completion and/or fracture stimulation of oil and natural gas wells range from 0.1 to 4 millimeters. The specific diameter distribution that would be most effective under given circumstances depends on the details of the subterranean environment in addition to depending on the type of application. The diameter distribution that would be most effective under given circumstances may be narrow or broad, monomodal or bimodal, and may also have other special features (such as following a certain statistical distribution function) depending on both the details of the subterranean environment and the type of application.

G. Optional Heat Treatment

Said particles are left in the reactor fluid that remains after suspension polymerization if optional heat treatment is to be used. Said reactor fluid thus serves as the heat treatment medium. This approach works especially well (without adverse effects such as degradation and/or swelling) in enhancing the curing of said particles where the polymer matrix consists of a terpolymer of S, EVB and DVB. Since the reactor fluid that remains after the completion of suspension polymerization is aqueous while these terpolymers are very hydrophobic, the reactor fluid serves as an excellent heat transfer medium which does not swell the particles. The use of the reactor fluid as the medium for the optional heat treatment also has the advantage of simplicity since the particles would have needed to be removed from the reactor fluid and placed in another fluid as an extra step before heat treatment if an alternative fluid had been required.

Detailed and realistic simulations based on the solution of the heat transfer equations are often used optionally to optimize the heat exposure schedule if optional heat treatment is to be used. It has been found that such simulations become increasingly useful with increasing quantity of particles that will be heat treated simultaneously. The reason is the finite rate of heat transfer. Said finite rate results in slower and more difficult equilibration with increasing quantity of particles and hence makes it especially important to be able to predict how to cure most of the particles further uniformly and sufficiently without overexposing many of the particles to heat.

EXAMPLE

The currently preferred embodiments of the invention will be understood better in the context of a specific example. It is to be understood that said example is being provided without reducing the generality of the invention. Persons skilled in the art can readily imagine many additional examples that fall within the scope of the currently preferred embodiments as taught in the DETAILED DESCRIPTION OF THE INVENTION section. Persons skilled in the art can, furthermore, also readily imagine many alternative embodiments that fall within the full scope of the invention as taught in the SUMMARY OF THE INVENTION section.

A. Summary

The thermoset matrix was prepared from a formulation containing 10% DVB by weight of the starting monomer mixture. The DVB had been purchased as a mixture where only 63% by weight consisted of DVB. The actual polymerizable monomer mixture used in preparing the thermoset matrix consisted of roughly 84.365% S, 5.635% EVB and 10% DVB by weight.

Carbon black (Monarch 280) was incorporated into the particles, at 0.5% by weight, via dispersion in the organic phase of the formulation prior to polymerization. Since the specific gravity of carbon black is roughly 1.8 while the specific gravity of the polymer is roughly 1.04, the amount of carbon black incorporated into the particles was roughly 0.29% by volume.

Suspension polymerization was performed in a pilot plant reactor, via rapid rate polymerization as taught by Albright (U.S. Pat. No. 6,248,838) which is incorporated herein by reference. In applying this method, the "dual initiator" approach, wherein two initiators with different thermal stabilities are used to help drive the reaction of DVB further towards completion, was utilized.

The required tests only require a small quantity of particles. The use of a liquid medium (such as the reactor fluid) is unnecessary for the heat treatment of a small sample. Roughly 500 grams of particles were hence removed from the slurry, washed, spread very thin on a tray, heat-treated for ten minutes at 200° C. in an oven in an inert gas environment, and submitted for testing.

The glass transition temperature of these "heat-treated" particles, and the liquid conductivity of packings thereof, were then measured by independent testing laboratories (Impact Analytical in Midland, Mich., and FracTech Laboratories in Surrey, United Kingdom, respectively).

Figure 5:
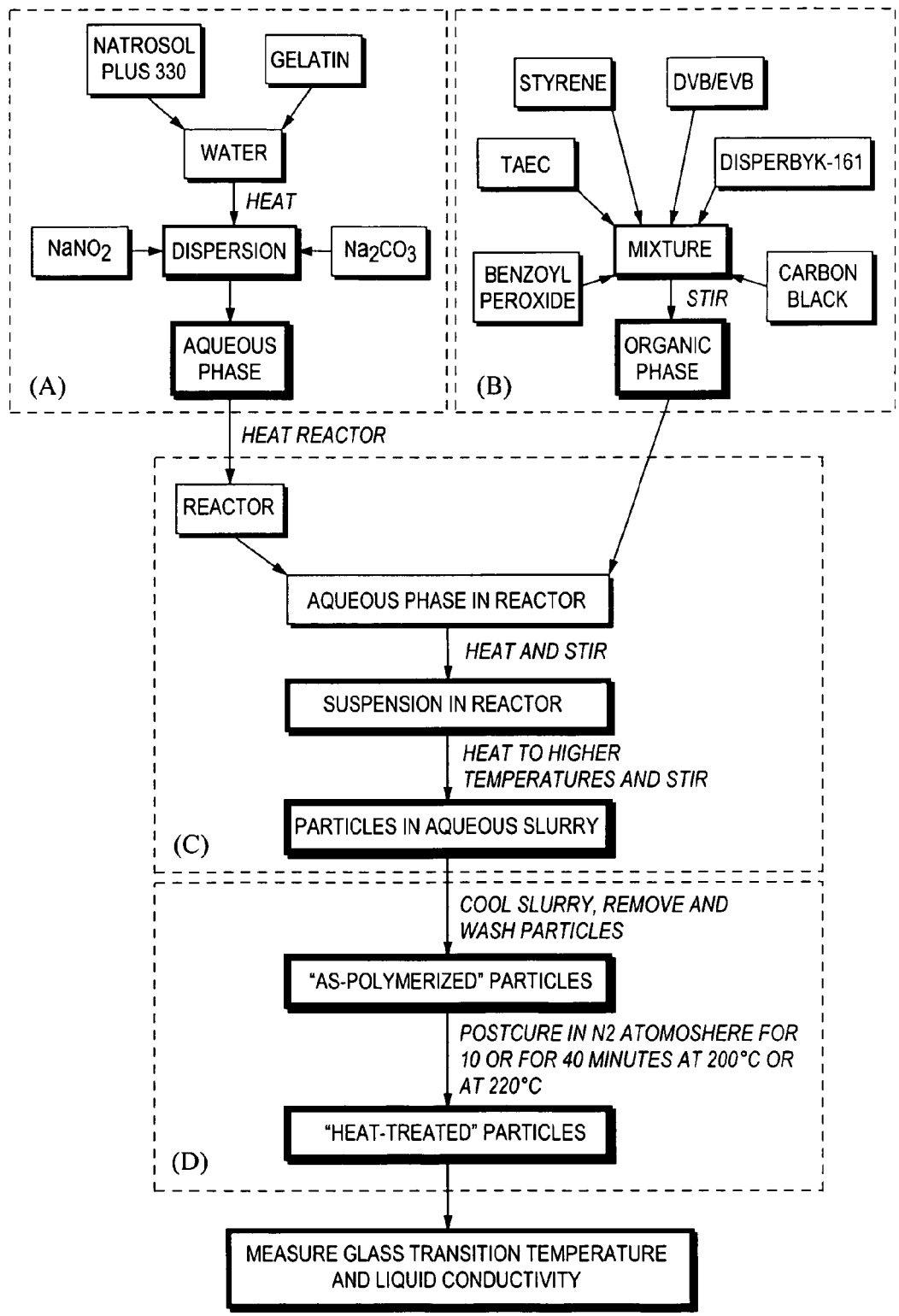
FIG. 5 provides a process flow diagram depicting the preparation of the example. It contains four major blocks; depicting the preparation of the aqueous phase (Block A), the preparation of the organic phase (Block B), the mixing of these two phases followed by suspension polymerization (Block C), and the further process steps used after polymerization to obtain the "as-polymerized" and "heat-treated" samples of particles (Block D).

FIG. 5 provides a process flow diagram depicting the preparation of the example. It contains four major blocks; depicting the preparation of the aqueous phase (Block A), the preparation of the organic phase (Block B), the mixing of these two phases followed by suspension polymerization (Block C), and the further process steps used after polymerization to obtain the "as-polymerized" and "heat-treated" samples of particles (Block D).

The following subsections will provide further details on the formulation, preparation and testing of this working example, to enable persons who are skilled in the art to reproduce the example.

B. Formulation

An aqueous phase and an organic phase must be prepared prior to suspension polymerization. The aqueous phase and the organic phase, which were prepared in separate beakers and then used in the suspension polymerization of the particles of this example, are described below.

1. Aqueous Phase

The aqueous phase used in the suspension polymerization of the particles of this example, as well as the procedure used to prepare said aqueous phase, are summarized in TABLE 1.

TABLE 1

The aqueous phase was prepared by adding Natrosol Plus 330 and gelatin (Bloom strength 250) to water, heating to 65° C. to disperse the Natrosol Plus 330 and the gelatin in the water, and then adding sodium nitrite and sodium carbonate. Its composition is listed below.

| INGREDIENT | WEIGHT (g) | % |
|---|---|---|
| Water | 1493.04 | 98.55 |
| Natrosol Plus 330 (hydroxyethylcellulose) | 7.03 | 0.46 |
| Gelatin (Bloom strength 250) | 3.51 | 0.23 |
| Sodium Nitrite (NaNO$_2$) | 4.39 | 0.29 |
| Sodium Carbonate (Na$_2$CO$_3$) | 7.03 | 0.46 |
| Total Weight in Grams | 1515.00 | 100.00 |

2. Organic Phase

The organic phase used in the suspension polymerization of the particles of this example, as well as the procedure used to prepare said organic phase, are summarized in TABLE 2. Note that the nanofiller (carbon black) was added to the organic phase in this particular example.

TABLE 2

The organic phase was prepared by placing the monomers, benzoyl peroxide (an initiator), t-amyl peroxy(2-ethylhexyl)monocarbonate (TAEC, also an initiator), Disperbyk-161 and carbon black together and agitating the resulting mixture for at least 15 minutes to disperse carbon black in the mixture. Its composition is listed below. After taking the other components of the 63% DVB mixture into account, the polymerizable monomer mixture actually consisted of roughly 84.365% S, 5.635% EVB and 10% DVB by weight. The total polymerizable monomer weight of was 1356.7 grams. The resulting thermoset nanocomposite particles thus contained [100 × 6.8/(1356.7 + 6.8)] = 0.5% by weight of carbon black.

| INGREDIENT | WEIGHT (g) | % |
|---|---|---|
| Styrene (pure) | 1144.58 | 82.67 |
| Divinylbenzene (63% DVB, 98.5% polymerizable monomers) | 215.35 | 15.56 |
| Carbon black (Monarch 280) | 6.8 | 0.49 |
| Benzoyl peroxide | 13.567 | 0.98 |
| t-Amyl peroxy(2-ethylhexyl)monocarbonate (TAEC) | 4.07 | 0.29 |
| Disperbyk-161 | 0.068 | 0.0049 |
| Total Weight in Grams | 1384.435 | 100 |

C. Preparation of Particles from Formulation

Once the formulation is prepared, its aqueous and organic phases are mixed, polymerization is performed, and "as-polymerized" and "heat-treated" particles are obtained, as described below.

1. Mixing

The aqueous phase was added to the reactor at 65° C. The organic phase was then introduced over roughly 5 minutes with agitation at the rate of 90 rpm. The mixture was held at 65° C. with stirring at the rate of 90 rpm for at least 15 minutes or until proper dispersion had taken place as manifested by the equilibration of the droplet size distribution.

2. Polymerization

Figure 6:
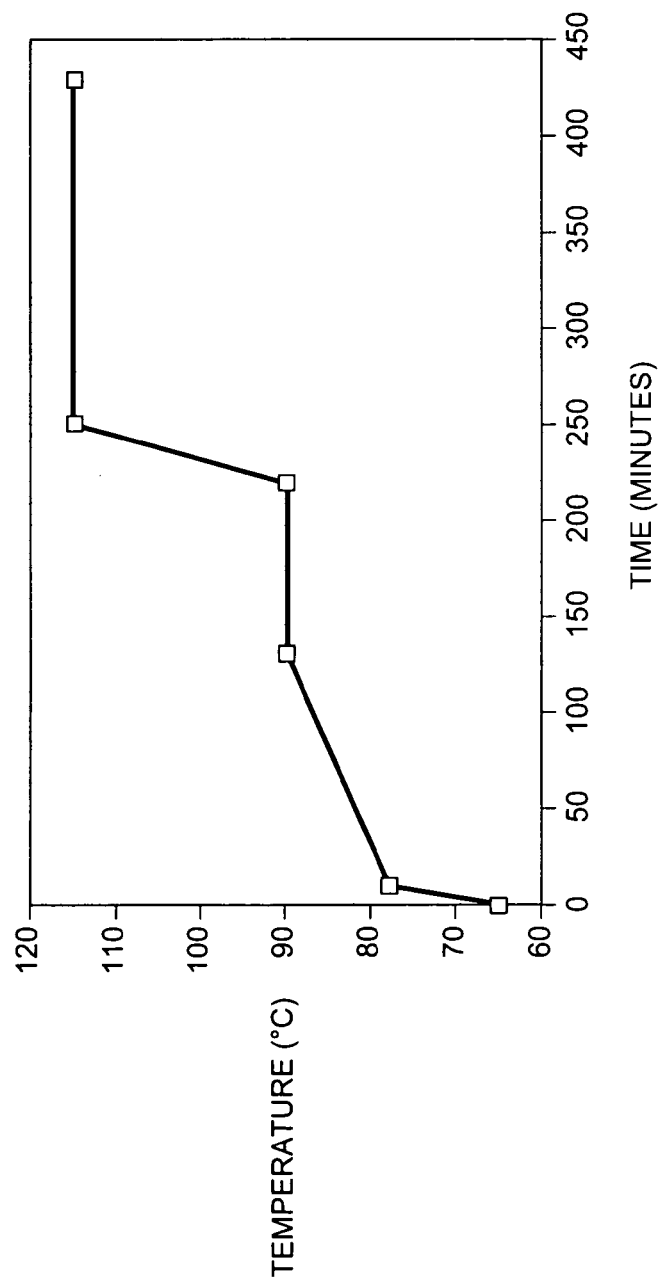
FIG. 6 shows the variation of the temperature with time during polymerization.

The temperature was ramped from 65° C. to 78° C. in 10 minutes. It was then further ramped from 78° C. to 90° C. at the rate of 0.1° C. per minute in 120 minutes. It was then held at 90° C. for 90 minutes to provide most of the conversion of monomer to polymer, with benzoyl peroxide (half life of one hour at 92° C.) as the effective initiator. It was then further ramped to 115° C. in 30 minutes and held at 115° C. for 180 minutes to advance the curing with TAEC (half life of one hour at 117° C.) as the effective initiator. The particles were thus obtained in an aqueous slurry. FIG. 6 shows the variation of the temperature with time during polymerization.

3. "As-Polymerized" Particles

The aqueous slurry was cooled to 40° C. It was then poured onto a 60 mesh (250 micron) sieve to remove the aqueous reactor fluid as well as any undesirable small particles that may have formed during polymerization. The "as-polymerized" beads of larger than 250 micron diameter obtained in this manner were then washed three times with warm (40° C. to 50° C.) water 4. "Heat-Treated" Particles Three sets of "heat-treated" particles, which were imposed to different thermal histories during the post-polymerization heat treatment, were prepared from the "as-polymerized" particles. In preparing each of these heat-treated samples, washed beads were removed from the 60 mesh sieve, spread very thin on a tray, placed in an oven under an inert gas (nitrogen) blanket, and subjected to the desired heat exposure. Sample 10m200C was prepared with isothermal annealing for 10 minutes at 200° C. Sample 40m200C was prepared with isothermal annealing for 40 minutes at 200° C. to explore the effects of extending the duration of isothermal annealing at 200° C. Sample 10m220C was prepared with isothermal annealing for 10 minutes at 220° C. to explore the effects of increasing the temperature at which isothermal annealing is performed for a duration of 10 minutes. In each case, the oven was heated to 100° C., the sample was placed in the oven and covered with a nitrogen blanket; and the temperature was then increased to its target value at a rate of 2° C. per minute, held at the target temperature for the desired length of time, and finally allowed to cool to room temperature by turning off the heat in the oven. Some particles from each sample were sent to Impact Analytical for the measurement of $T_g$ via DSC.

Particles of $^{14}/_{16}$ U.S. mesh size were isolated from Sample 40m200C by some additional sieving. This is a very narrow size distribution, with the particle diameters ranging from 1.19 mm to 1.41 mm. This nearly monodisperse assembly of particles was sent to FracTech Laboratories for the measurement of the liquid conductivity of its packings.

D. Reference Sample

A Reference Sample was also prepared, to provide a baseline against which the data obtained for the particles of the invention can be compared.

The formulation and the fabrication process conditions used in the preparation of the Reference Sample differed from those used in the preparation of the examples of the particles of the invention in two key aspects. Firstly, carbon black was not used in the preparation of the Reference Sample. Secondly, post-polymerization heat treatment was not performed in the preparation of the Reference Sample. Consequently, while the examples of the particles of the invention consisted of a heat-treated and carbon black reinforced thermoset nanocomposite, the particles of the Reference Sample consisted of an unfilled and as-polymerized thermoset polymer that has the same composition as the thermoset matrix of the particles of the invention.

Some particles from the Reference Sample were sent to Impact Analytical for the measurement of $T_g$ via DSC. In addition, particles of $^{14}/_{16}$ U.S. mesh size were isolated from the Reference Sample by sieving and sent to FracTech Laboratories for the measurement of the liquid conductivity of their packings E. Differential Scanning Calorimetry DSC experiments (ASTM E1356-03) were carried out by using a TA Instruments Q100 DSC with nitrogen flow of 50 mL/min through the sample compartment. Roughly nine milligrams of each sample were weighed into an aluminum sample pan, the lid was crimped onto the pan, and the sample was then placed in the DSC instrument. The sample was then scanned from 5° C. to 225° C. at a rate of 10° C. per minute. The instrument calibration was checked with NIST SRM 2232 indium. Data analysis was performed by using the TA Universal Analysis V4.1 software.

Figure 7:
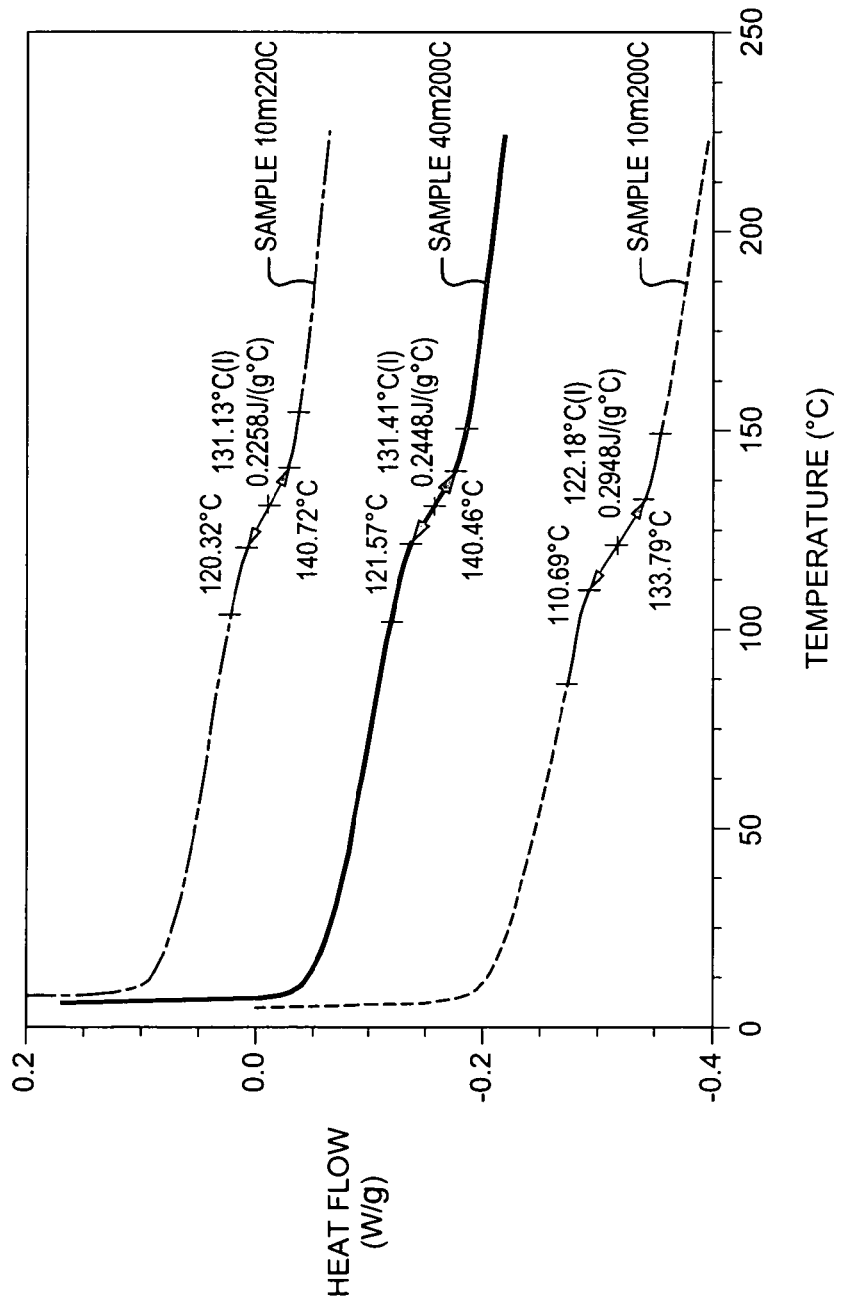
FIG. 7 shows the results of the measurement of the glass transition temperatures ($T_g$) of the three heat-treated thermoset nanocomposite samples via differential scanning calorimetry (DSC). The samples have identical compositions. They differ only as a result of the use of different heat treatment conditions after polymerization. $T_g$ was defined as the temperature at which the curve showing the heat flow as a function of the temperature goes through its inflection point.

DSC data for the heat-treated samples are shown in FIG. 7. $T_g$ was defined as the temperature at which the curve for the heat flow as a function of the temperature went through its inflection point. The results are summarized in TABLE 3. It is seen that the extent of polymer curing in Sample 10m220C is comparable to that in Sample 40m200C, and that the extent of polymer curing in both of these samples has advanced significantly further than that in Sample 10m200C whose $T_g$ was only slightly higher than that of the Reference Sample.

TABLE 3

Glass transitions temperatures ($T_g$) of the three heat-treated samples and of the Reference Sample, in ° C. In addition to being an "as-polymerized" (rather than a heat-treated) sample, the Reference Sample also differs from the other three samples since it is an unfilled sample while the other three samples each contain 0.5% by weight carbon black.

| SAMPLE | ISOTHERMAL HEAT TREATMENT IN NITROGEN | $T_g$ (° C.) |
| --- | --- | --- |
| Reference Sample | None | 117.17 |
| 10 m 200 C. | For 10 minutes at a temperature of 200° C. | 122.18 |
| 10 m 220 C. | For 10 minutes at a temperature of 220° C. | 131.13 |
| 40 m 200 C. | For 40 minutes at a temperature of 200° C. | 131.41 |

F. Liquid Conductivity Measurement

Figure 8:
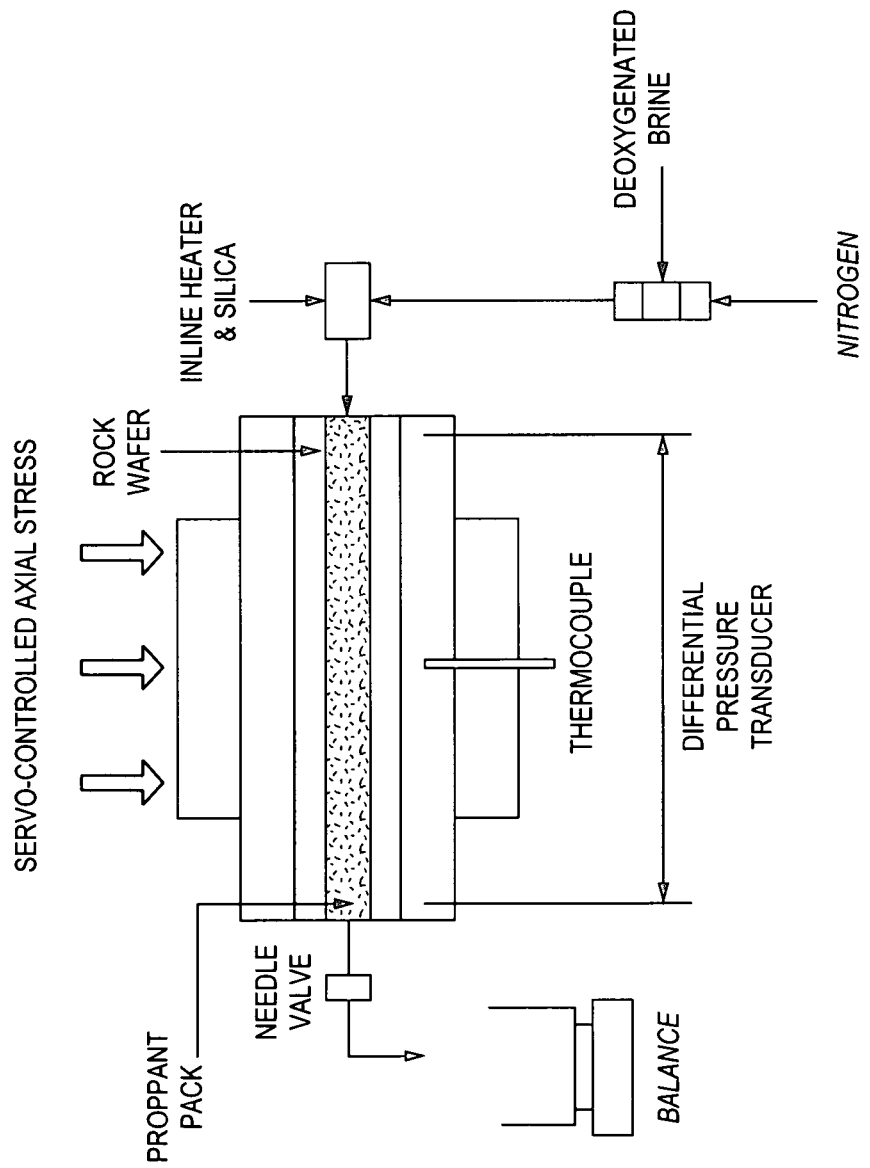
FIG. 8 provides a schematic illustration of the configuration of the conductivity cell.

A fracture conductivity cell allows a particle packing to be subjected to desired combinations of compressive stress (simulating the closure stress on a fracture in a downhole environment) and elevated temperature over extended durations, while the flow of a fluid through the packing is measured. The flow capacity can be determined from differential pressure measurements. The experimental setup is illustrated in FIG. 8.

Ohio sandstone, which has roughly a compressive elastic modulus of 4 Mpsi and a permeability of 0.1 mD, was used as a representative type of outcrop rock. Wafers of thickness 9.5 mm were machined to 0.05 mm precision and one rock was placed in the cell. The sample was split to ensure that a representative sample is achieved in terms of its particle size distribution and then weighed. The particles were placed in the cell and leveled. The top rock was then inserted. Heated steel platens were used to provide the correct temperature simulation for the test. A thermocouple inserted in the middle port of the cell wall recorded the temperature of the pack. A servo-controlled loading ram provided the closure stress. The conductivity of deoxygenated silica-saturated 2% potassium chloride (KCl) brine of pH 7 through the pack was measured.

The conductivity measurements were performed by using the following procedure:

1. A 70 mbar full range differential pressure transducer was activated by closing the bypass valve and opening the low pressure line valve.
2. When the differential pressure appeared to be stable, a tared volumetric cylinder was placed at the outlet and a stopwatch was started.
3. The output of the differential pressure transducer was fed to a data logger 5-digit resolution multimeter which logs the output every second during the measurement.
4. Fluid was collected for 5 to 10 minutes, after which time the flow rate was determined by weighing the collected effluent. The mean value of the differential pressure was retrieved from the multimeter together with the peak high and low values. If the difference between the high and low values was greater than the 5% of the mean, the data point was disregarded.
5. The temperature was recorded from the inline thermocouple at the start and at the end of the flow test period. If the temperature variation was greater than 0.5° C., the test was disregarded. The viscosity of the fluid was obtained from the measured temperature by using viscosity tables. No pressure correction is made for brine at 100 psi. The density of brine at elevated temperature was obtained from these tables.
6. At least three permeability determinations were made at each stage. The standard deviation of the determined permeabilities was required to be less than 1% of the mean value for the test sequence to be considered acceptable.
7. At the end of the permeability testing, the widths of each of the four corners of the cell were determined to 0.01 mm resolution by using vernier calipers.

The test results are summarized in TABLE 4.

TABLE 4

Measurements on packings of 14/16 U.S. mesh size of Sample 40 m 200 C. and of the Reference Sample at a coverage of 0.02 lb/ft². The conductivity (mDft) of deoxygenated silica-saturated 2% potassium chloride (KCl) brine of pH 7 through each sample was measured at a temperature of 190° F. (87.8° C.) under a compressive stress of 4000 psi (27.579 MPa).

| Time (hours) | Reference Sample Conductivity (mDft) | Time (hours) | Sample 40 m 200 C. Conductivity (mDft) |
|---|---|---|---|
| 27 | 1179 | 45 | 1329 |
| 49 | 1040 | 85 | 1259 |
| 72 | 977 | 109 | 1219 |
| 97 | 903 | 133 | 1199 |
| 120 | 820 | 157 | 1172 |
| 145 | 772 | 181 | 1151 |
| 168 | 736 | 205 | 1126 |
| 192 | 728 | 233 | 1110 |
| 218 | 715 | | |
| 260 | 720 | | |

Figure 9:
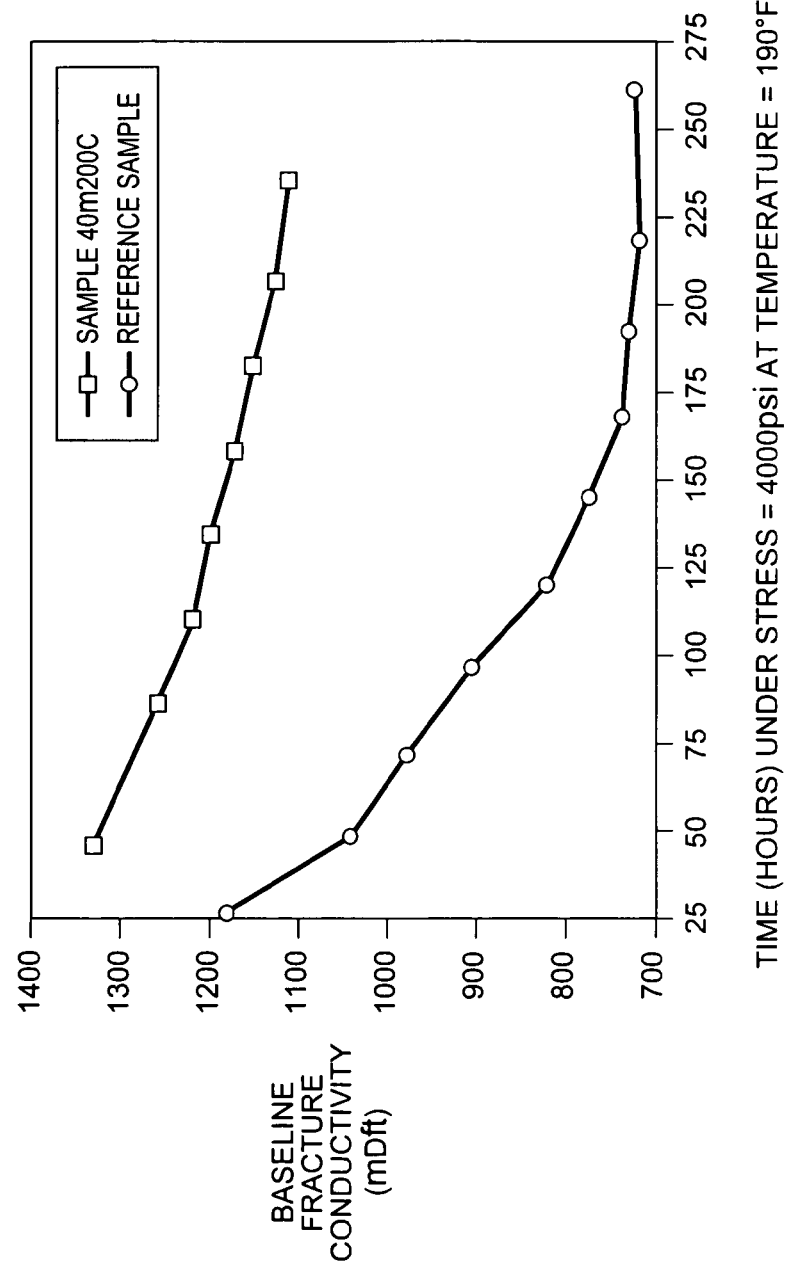
FIG. 9 shows the measured liquid conductivity of a packing of particles of 14/16 U.S. mesh size (diameters ranging from 1.19 mm to 1.41 mm) from Sample 40m200C, at a coverage of 0.02 lb/ft$^2$, under a closure stress of 4000 psi at a temperature of 190° F., as a function of time.

These results are shown in FIG. 9. They demonstrate clearly the advantage of the particles of the invention in terms of the enhanced retention of liquid conductivity under a compressive stress of 4000 psi at a temperature of 190° F.

What is claimed:

1. A polymeric-nanocomposite spherical bead exhibiting at least one of enhanced resistance to deformation under load, enhanced retention of resistance at elevated temperature, and enhanced retention of resistance in acidic, basic, or hydrocarbon environments; comprising: a polymer matrix; and from 0.001 to 60 volume percent of nanofiller particles possessing a length that is less than 0.5 microns in at least one principal axis direction, wherein said nanofiller particles comprise at least one of fine particulate material, fibrous material, discoidal material, or a combination of such materials; and wherein said nanofiller particles are selected from the group consisting of natural nanoclays, synthetic nanoclays or mixtures thereof, said nanofiller particles being-dispersed throughout said polymeric nanocomposite spherical bead, wherein said spherical bead has diameter ranging from 0.1 mm to 4 mm and wherein said spherical bead has about neutral buoyancy relative to water.

2. The polymeric nanocomposite spherical bead of claim 1, wherein said polymer matrix comprises a terpolymer.

3. The polymeric nanocomposite spherical bead of claim 2, wherein said polymer matrix comprises a styrene-ethylvinylbenzene-divinylbenzene terpolymer.

4. The polymeric-nanocomposite spherical bead of claim 1, wherein said nanofiller particles possess a length that is less than 0.5 microns in at least one principal axis direction and an amount from 0.1% to 15% of said polymeric nanocomposite spherical bead by volume.

* * * * *